United States Patent
Choudhary et al.

(10) Patent No.: US 12,472,720 B2
(45) Date of Patent: Nov. 18, 2025

(54) MATERIALS AND ADDITIVELY MANUFACTURED OBJECTS WITH MECHANICALLY INTERLOCKING ELEMENTS

(71) Applicant: Align Technology, Inc., San Jose, CA (US)

(72) Inventors: Umesh Upendra Choudhary, Santa Cruz, CA (US); Michael Christopher Cole, San Jose, CA (US); Crystal Tjhia, Sunnyvale, CA (US)

(73) Assignee: Align Technology, Inc., San Jose, CA (US)

( * ) Notice: Subject to any disclaimer, the term of this patent is extended or adjusted under 35 U.S.C. 154(b) by 212 days.

(21) Appl. No.: 18/494,216

(22) Filed: Oct. 25, 2023

(65) Prior Publication Data
US 2024/0140065 A1    May 2, 2024

Related U.S. Application Data

(60) Provisional application No. 63/381,097, filed on Oct. 26, 2022.

(51) Int. Cl.
*B32B 3/06*  (2006.01)
*B33Y 80/00*  (2015.01)
*A61C 7/08*  (2006.01)

(52) U.S. Cl.
CPC ............... *B32B 3/06* (2013.01); *B33Y 80/00* (2014.12); *A61C 7/08* (2013.01)

(58) Field of Classification Search
CPC .............. B32B 3/06; B33Y 80/00; A61C 7/08
See application file for complete search history.

(56) References Cited

U.S. PATENT DOCUMENTS

| | | |
|---|---|---|
| 6,210,162 B1 | 4/2001 | Chishti et al. |
| 6,309,215 B1 | 10/2001 | Phan et al. |
| 6,450,807 B1 | 9/2002 | Chishti et al. |
| 6,497,574 B1 | 12/2002 | Miller |

(Continued)

FOREIGN PATENT DOCUMENTS

| | | |
|---|---|---|
| WO | 2015075094 A1 | 5/2015 |
| WO | 2016078838 A1 | 5/2016 |

(Continued)

OTHER PUBLICATIONS

Zareiyan, Babek et al., Effects of interlocking on interlayer adhesion and strength of structures in 3D printing of concrete, Automation in Construction, 2017, 83, 10 pages.

(Continued)

*Primary Examiner* — Betelhem Shewareged
(74) *Attorney, Agent, or Firm* — FORTEM IP LLP

(57) ABSTRACT

Materials and additively manufactured objects including mechanically interlocking elements are provided. In some embodiments, a dental appliance includes an appliance body made at least partially out of a composite material. The composite material can include an interlocking structure having a plurality of interlocking elements. The interlocking structure can have a first mechanical property. The composite material can also include a matrix surrounding at least a portion of the interlocking structure. The matrix can have a second mechanical property different from the first mechanical property.

20 Claims, 14 Drawing Sheets

(56) References Cited

U.S. PATENT DOCUMENTS

| | | |
|---|---|---|
| 6,749,414 B1 | 6/2004 | Hanson et al. |
| 6,830,450 B2 | 12/2004 | Knopp et al. |
| 6,957,118 B2 | 10/2005 | Kopelman et al. |
| 6,976,627 B1 | 12/2005 | Culp et al. |
| 7,092,784 B1 | 8/2006 | Simkins |
| 7,192,273 B2 | 3/2007 | McSurdy, Jr. |
| 7,220,124 B2 | 5/2007 | Taub et al. |
| 7,236,842 B2 | 6/2007 | Kopelman et al. |
| 7,245,977 B1 | 7/2007 | Simkins |
| 7,261,533 B2 | 8/2007 | Wrosz et al. |
| 7,335,024 B2 | 2/2008 | Wen |
| 7,384,266 B2 | 6/2008 | Wen |
| 7,435,084 B2 | 10/2008 | Liu et al. |
| 7,472,789 B2 | 1/2009 | Wu et al. |
| 7,476,100 B2 | 1/2009 | Kuo |
| 7,481,647 B2 | 1/2009 | Sambu et al. |
| 7,604,181 B2 | 10/2009 | Culp et al. |
| 7,641,828 B2 | 1/2010 | DeSimone et al. |
| 7,648,360 B2 | 1/2010 | Kuo |
| 7,674,422 B2 | 3/2010 | Kuo |
| 7,711,447 B2 | 5/2010 | Lu et al. |
| 7,748,199 B2 | 7/2010 | Sankaran et al. |
| 7,802,987 B1 | 9/2010 | Phan |
| 7,819,659 B2 | 10/2010 | Wen |
| 7,831,322 B2 | 11/2010 | Liu et al. |
| 7,840,373 B2 | 11/2010 | Culp et al. |
| 7,892,474 B2 | 2/2011 | Shkolnik et al. |
| 7,922,490 B2 | 4/2011 | Wen |
| 7,957,824 B2 | 6/2011 | Boronvinskih et al. |
| 8,019,465 B2 | 9/2011 | Spiridonov et al. |
| 8,030,588 B2 | 10/2011 | Culp et al. |
| 8,087,932 B2 | 1/2012 | Liu |
| 8,636,513 B2 | 1/2014 | Wen |
| 8,765,031 B2 | 7/2014 | Li et al. |
| 8,776,391 B1 | 7/2014 | Kaza et al. |
| 9,108,338 B2 | 8/2015 | Sirovskiy et al. |
| 9,403,238 B2 | 8/2016 | Culp |
| 9,700,385 B2 | 7/2017 | Webber |
| 9,844,424 B2 | 12/2017 | Wu et al. |
| 9,943,386 B2 | 4/2018 | Webber et al. |
| 9,943,991 B2 | 4/2018 | Tanugula et al. |
| 10,162,264 B2 | 12/2018 | McLeod et al. |
| 10,336,102 B2 | 7/2019 | Cole |
| 10,495,973 B2 | 12/2019 | Cole |
| 10,537,406 B2 | 1/2020 | Wu et al. |
| 10,695,975 B2* | 6/2020 | Hakkaku .................. B41J 2/01 |
| 10,783,629 B2 | 9/2020 | Parpara et al. |
| 10,888,395 B2 | 1/2021 | Kopelman |
| 10,993,783 B2 | 5/2021 | Wu et al. |
| 11,045,283 B2 | 6/2021 | Riley et al. |
| 11,103,330 B2 | 8/2021 | Webber et al. |
| 11,189,021 B2 | 11/2021 | Shah et al. |
| 11,273,011 B2 | 3/2022 | Shanjani et al. |
| 11,295,444 B2 | 4/2022 | Cherkas et al. |
| 11,318,667 B2 | 5/2022 | Mojdeh et al. |
| 11,370,173 B2 | 6/2022 | Kelly et al. |
| 11,420,362 B2 | 8/2022 | Mojdeh et al. |
| 11,511,485 B2 | 11/2022 | Mojdeh et al. |
| 11,534,277 B2 | 12/2022 | Chavez et al. |
| 11,554,000 B2 | 1/2023 | Webber |
| 11,564,777 B2 | 1/2023 | Kopelman et al. |
| 11,596,502 B2 | 3/2023 | Webber et al. |
| 11,602,413 B2 | 3/2023 | Chen et al. |
| 11,666,415 B2 | 6/2023 | Wang et al. |
| 11,793,606 B2 | 10/2023 | Cam et al. |
| 2004/0243361 A1 | 12/2004 | Steuben et al. |
| 2006/0093982 A1 | 5/2006 | Wen |
| 2006/0093987 A1 | 5/2006 | Wen |
| 2006/0093993 A1 | 5/2006 | Wen |
| 2006/0127850 A1 | 6/2006 | Wen |
| 2006/0127857 A1 | 6/2006 | Liu et al. |
| 2006/0127858 A1 | 6/2006 | Wen |
| 2006/0127859 A1 | 6/2006 | Wen |
| 2006/0127860 A1 | 6/2006 | Wen |
| 2006/0172250 A1 | 8/2006 | Wen |
| 2006/0199145 A1 | 9/2006 | Liu et al. |
| 2007/0092853 A1 | 4/2007 | Liu et al. |
| 2007/0243502 A1 | 10/2007 | Wen |
| 2008/0083348 A1 | 4/2008 | Kuo et al. |
| 2009/0148814 A1 | 6/2009 | Li et al. |
| 2014/0061974 A1 | 3/2014 | Tyler |
| 2014/0265034 A1 | 9/2014 | Dudley |
| 2015/0097315 A1 | 4/2015 | DeSimone et al. |
| 2017/0135793 A1 | 5/2017 | Webber et al. |
| 2019/0046297 A1 | 2/2019 | Kopelman et al. |
| 2019/0231480 A1* | 8/2019 | Moore, III ............. B33Y 80/00 |
| 2019/0262101 A1 | 8/2019 | Shanjani et al. |
| 2019/0298494 A1 | 10/2019 | Webber et al. |
| 2020/0290262 A1 | 9/2020 | Aguilar Mendez et al. |
| 2021/0030516 A1 | 2/2021 | O'Leary et al. |
| 2021/0146619 A1 | 5/2021 | Shusteff et al. |
| 2021/0259809 A1 | 8/2021 | O'Leary et al. |
| 2021/0259812 A1 | 8/2021 | O'Leary et al. |
| 2022/0183795 A1 | 6/2022 | Webber et al. |
| 2022/0227051 A1 | 7/2022 | Regehly |
| 2022/0259781 A1 | 8/2022 | Kulkova et al. |
| 2024/0051225 A1 | 2/2024 | Dorfinger et al. |
| 2024/0140065 A1* | 5/2024 | Choudhary ............ B33Y 80/00 |

FOREIGN PATENT DOCUMENTS

| | | |
|---|---|---|
| WO | 2017115076 A1 | 7/2017 |
| WO | 2018032022 A1 | 2/2018 |
| WO | 2020070639 A1 | 4/2020 |
| WO | 2020245456 A1 | 12/2020 |
| WO | 2021087061 A2 | 5/2021 |
| WO | 2021130657 A1 | 7/2021 |
| WO | 2021130661 A1 | 7/2021 |
| WO | 2022011456 A1 | 1/2022 |

OTHER PUBLICATIONS

Kim, Seul Gi et al., Development of fabrics by digital light processing three-dimensional printing technology and using a polyurethane acrylate photopolymer, Textile Research Journal, 2020, vol. 90(7-8), 10 pages.

Bernardeschi, Irene et al., A Review of Active 3D Microstructures via Direct Laser Lithography, Advanced Intelligent Systems, 2021, 3, 2100051, 20 pages.

Ueda, Kazunori, Interlocking 3D-printed bars, trusses and space frames to build arbitrarily large structures, Department of Computer Science and Engineering, Waseda University, 7 pages.

Alcântara, C. C. J. et al., Mechanically interlocked 3D multi-material micromachines, Nature Communications, 2020, 11:5957, 8 pages.

Saha, Sourabh K. et al., Scalable submicrometer additive manufacturing, Science, 2019, 366, 6 pages.

* cited by examiner

MATERIALS AND ADDITIVELY MANUFACTURED OBJECTS WITH MECHANICALLY INTERLOCKING ELEMENTS

CROSS-REFERENCE TO RELATED APPLICATION(S)

The present application claims the benefit of priority to U.S. Provisional Patent Application No. 63/381,097, filed on Oct. 26, 2022, which is incorporated by reference herein in its entirety.

TECHNICAL FIELD

The present technology generally relates to materials, and in particular, to materials and additively manufactured objects with mechanically interlocking elements.

BACKGROUND

Additive manufacturing encompasses a variety of technologies that involve building up 3D objects from multiple layers of material. Typically, additively manufactured objects are made from a single material and have a uniform composition throughout the entire object. However, the mechanical properties of such objects may be unsuitable for certain applications. For example, conventional additive manufacturing techniques and materials may not be capable of producing an orthodontic appliance having sufficient stiffness to apply repositioning forces to teeth, but also having sufficient toughness for use over extended time periods. Additionally, orthodontic appliances and other objects fabricated using conventional additive manufacturing processes may include integrally formed supports, which can be difficult and labor-intensive to separate from the object during post-processing.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure.

DETAILED DESCRIPTION

Figure 1A:
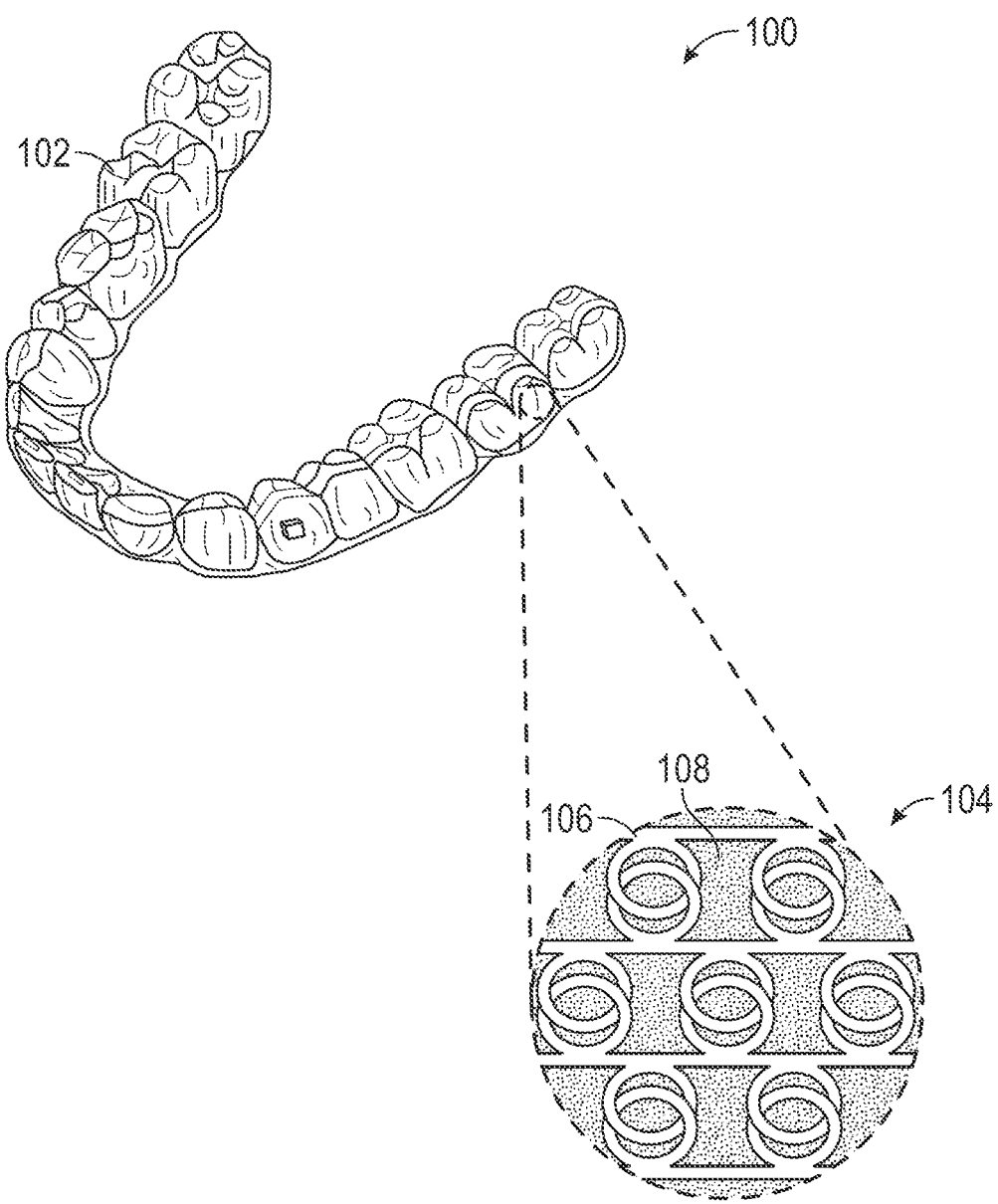
FIG. 1A is a perspective view of a dental appliance configured in accordance with embodiments of the present technology.

The present technology relates to materials and additively manufactured objects including mechanically interlocking elements. In some embodiments, for example, a dental appliance includes an appliance body made at least partially out of a composite material. The composite material can include an interlocking structure having a plurality of interlocking elements. The interlocking structure can have a first mechanical property (e.g., a first modulus and/or stiffness). The composite material can also include a matrix surrounding at least a portion of the interlocking structure. The matrix can have a second mechanical property different from the first mechanical property (e.g., a second modulus and/or stiffness less than the first modulus and/or stiffness).

As another example, a method can include fabricating a first portion of an appliance including a first interlocking element via an additive manufacturing process, and fabricating a second portion of the appliance including a second interlocking element via the additive manufacturing process. The second interlocking element can be fabricated in situ in an interlocking configuration with the first interlocking element. In some embodiments, the first portion can be decoupled from the second portion by disengaging the first and second interlocking elements.

The present technology can provide many advantages compared to conventional materials and devices. For example, the composite materials described herein can provide favorable mechanical properties that would be difficult to achieve in conventional materials (e.g., homogenous materials), such as improved toughness. In some embodiments, the materials described herein are advantageous for applying repositioning forces to teeth while also maintaining sufficient flexibility to avoid brittle fracture during use. As another example, the objects with interlocking elements described herein allow different portions of the object to be separated from each other without fracturing, plastically deforming, or otherwise damaging one or both portions of the object. This technique can be beneficial, for instance, when separating a temporary component of a device (e.g., supports) from a functional component of the device (e.g., a component that is intended to be applied to the patient's teeth, such as an attachment, aligner shell, etc.).

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

As used herein, the terms "vertical," "lateral," "upper," "lower," "left," "right," etc., can refer to relative directions or positions of features of the embodiments disclosed herein in view of the orientation shown in the Figures. For example, "upper" or "uppermost" can refer to a feature positioned closer to the top of a page than another feature. These terms, however, should be construed broadly to include embodiments having other orientations, such as inverted or inclined orientations where top/bottom, over/under, above/below, up/down, and left/right can be interchanged depending on the orientation.

The headings provided herein are for convenience only and do not interpret the scope or meaning of the claimed present technology. Embodiments under any one heading may be used in conjunction with embodiments under any other heading.

I. Composite Materials with Mechanic ally Interlocking Elements

In some embodiments, the present technology provides composite materials that include a structure having a plurality of mechanically interlocked elements (also referred to as an "interlocking structure" or "interlocking architecture"). As used herein, an "interlocked element" or "interlocking element" can refer to an element that is mechanically coupled to at least one other element in manner that constrains the movement of the elements relative to each other (e.g., constrained along one, two, or three degrees of freedom in translation and/or constrained along one, two, or three degrees of freedom in rotation). The interlocked elements can be discrete elements, in that the interlocked elements (1) are not integrally formed with each other, and/or (2) are not adhered, bonded, fused, or connected to each other, other than through the interlocking coupling and/or a matrix (described below). Representative examples of interlocking elements are described in greater detail below in connection with FIGS. 2A-2M.

In some embodiments, the composite material is used to form a macroscopic object (e.g., a dental appliance), and the interlocking elements have a feature size that is smaller than the size scale of the macroscopic object. For example, the interlocking elements can have a feature size within a range from 0.1 µm to 10 mm, 0.1 µm to 1000 µm, 0.1 µm to 500 µm, 0.1 µm to 100 µm, 0.1 µm to 50 µm, 0.1 µm to 25 µm, 0.1 µm to 10 µm, 0.1 µm to 1 µm, 1 µm to 10 mm, 1 µm to 1000 µm, 1 µm to 500 µm, 1 µm to 100 µm, 1 µm to 50 µm, 1 µm to 25 µm, 1 µm to 10 µm, 10 µm to 100 µm, 10 µm to 50 µm, 10 µm to 25 µm, 25 µm to 50 µm, 50 µm to 100 µm, 100 µm to 10 mm, 100 µm to 1000 µm, or 1000 µm to 10 mm. The feature size of an interlocking element can correlate to a spatial dimension of the interlocking element, such as the height, length, width, depth, thickness, diameter, etc., of the interlocking element. In some embodiments, the feature size of an interlocking element correlates to the maximum spatial dimension of the interlocking element (e.g., if the height of the interlocking element is the largest spatial dimension of the interlocking element, then the height can be the feature size of the interlocking element). Alternatively, the feature size of an interlocking element can correlate to the minimum spatial dimension of the interlocking element (e.g., if the thickness of the interlocking element is the smallest spatial dimension, then the thickness can be the feature size of the interlocking element).

The size scale of the macroscopic object can be larger than the feature size of the interlocking elements by at least 1, 2, 3, 4, or 5 orders of magnitude. In some embodiments, the macroscopic object has a length, width, and/or height within a range from 1 cm to 50 cm, 1 cm to 20 cm, 1 cm to 10 cm, 1 cm to 5 cm, 5 cm to 10 cm, 5 cm to 25 cm, or 10 cm to 20 cm. The thickness of the macroscopic object can be within a range from 0.1 mm to 10 mm, 0.1 mm to 5 mm, 0.5 mm to 10 mm, 0.5 mm to 5 mm, or 5 mm to 10 mm.

Interlocking elements can be mechanically coupled through each other in various ways, including, but not limited to, linkages, joints, complementary and/or mating interfaces, weaving, intertwining, entanglements, or suitable combinations thereof. In some embodiments, the interlocking elements directly contact each other when coupled and when the composite material is in a resting and/or unloaded state (e.g., when forces are not applied to the composite material). In other embodiments, the interlocking elements do not directly contact each other when coupled and when the composite material is in the resting and/or unloaded state. In such embodiments, the neighboring surfaces of the interlocking elements can be spaced apart from each other by a gap. The size of the gap (e.g., minimum, maximum, and/or average size) can be within a range from 0.1 µm to 1000 µm, 0.1 µm to 500 µm, 0.1 µm to 100 µm, 0.1 µm to 50 µm, 0.1 µm to 25 µm, 0.1 µm to 10 µm, 0.1 µm to 1 µm, 1 µm to 500 µm, 1 µm to 100 µm, 1 µm to 50 µm, 1 µm to 25 µm, 1 µm to 10 µm, 10 µm to 100 µm, 10 µm to 50 µm, 10 µm to 25 µm, 25 µm to 50 µm, or 50 µm to 100 µm. The presence of a gap between interlocking elements can impart a degree of "looseness" to the interlocking structure, e.g., the interlocking elements can be capable of moving relative to each other in a relatively unconstrained manner over a predetermined range of motion, before the interlocking elements come into contact with each other and resist further motion. This configuration can produce a corresponding non-linear force-strain profile of the composite material, e.g., the composite material exhibits relatively little or no force for an initial strain below a certain strain threshold, then exhibits a larger force once the strain threshold is exceeded. The strain threshold can correlate to the gap size between interlocking elements.

Each interlocking element within the interlocking structure can be coupled to any suitable number of other interlocking elements, such as one, two, three, four, five, or more other interlocking elements. The interlocking elements can interact with each other so as to constrain movement along at least one first direction, while permitting movement along at least one second, different direction. For example, the interlocking elements can exhibit limited or no translational movement, but can remain unconstrained for rotational movements. Optionally, the interaction between interlocking elements can constrain movement along both the first direction(s) and second direction(s), but can impose a greater constraint on movements along the first direction(s) compared to movements along the second direction(s). For example, the interlocking elements can exhibit relatively limited translational movements, but have greater freedom for rotational movements. Accordingly, the interlocking structure (and thus, the overall composite material) can exhibit a higher modulus and/or stiffness along the first (constrained) direction(s), and thus can sustain and/or apply a greater amount of force along the first direction(s). The interlocking structure (and thus, the overall composite material) can exhibit a lower modulus and/or stiffness along the second (unconstrained or less constrained) direction(s), and thus can exhibit greater flexibility along the second direction(s). For example, the interlocking structure and composite material can exhibit high stiffness and/or modulus under tension, while also exhibiting high flexibility in bending.

In some embodiments, the first direction(s) include a first translational direction, and the second direction(s) include a second translational direction; the first direction(s) include first and second translational directions, and the second direction(s) include a third translational direction; the first direction(s) include a first translational direction, and the second direction(s) include second and third translational directions; the first direction(s) include a first rotational direction, and the second direction(s) include a second rotational direction; the first direction(s) include first and second rotational directions, and the second direction(s) include a third rotational direction; the first direction(s) include a first rotational direction, and the second direction(s) include second and third rotational directions; the first direction(s) include at least one translational direction and the second direction(s) include at least one rotational direction; the first direction(s) include at least one rotational direction and the second direction(s) include at least one translational direction; or suitable combinations thereof.

In some embodiments, the composite material includes a plurality of different types of interlocking structures, such as two, three, four, five, or more different types of interlocking structures. For example, the composite material can include a first region including a first type of interlocking structure, a second region including a second type of interlocking structure, a third region including a third type of interlocking structure, etc. Different types of interlocking structures can differ from each other with respect to geometry, size, types of interlocking elements present, density of the interlocking elements, material composition, material properties, or suitable combinations thereof. The types of interlocking structures used at a particular region of the composite material may depend on the desired mechanical properties and/or behavior for that region. For example, interlocking structures exhibiting a higher modulus and/or stiffness can be used in regions of a dental appliance intended to apply repositioning forces to teeth, while interlocking structures exhibiting greater flexibility can be used in regions expected to undergo greater deformation when worn on the patient's teeth.

Optionally, the composite material can include a combination of interlocking elements and non-interlocking elements. Non-interlocking elements can include elements that are integrally formed, adhered, bonded, and/or fused to each other, such that the elements cannot move relative to each other without deforming (e.g., elastic and/or plastic deformation) and/or fracturing the elements. For example, non-interlocking elements can be or include a cellular network composed of a plurality of unit cells, e.g., as described in U.S. Patent Application Publication No. 2019/0262101, which is incorporated by reference herein in its entirety. Non-interlocking elements can also include elements that are spatially separated from and not mechanically coupled to each other, e.g., a plurality of discrete particles, fibers, fillers, etc. In some embodiments, the composite material includes a first region including an interlocking structure having a plurality of interlocking elements, and a second region without the interlocking structure and/or including non-interlocking elements.

In some embodiments, the composite material includes a matrix coupled to the interlocking structure. For example, the interlocking structure can be partially or completely embedded in the matrix, such that the matrix surrounds at least a portion or the entirety of the interlocking structure. The matrix can infiltrate into and fill the spaces within the interlocking structure, including spaces between interlocking elements. Optionally, the matrix can be localized only to certain regions of the interlocking structure, such as the exterior region (e.g., on or proximate to the exterior surface), interior region (e.g., regions away from the exterior surface), regions at or proximate to the interlocking elements, regions away from interlocking elements, or suitable combinations thereof. In some embodiments, the entire composite material includes both the interlocking structure and the matrix. In other embodiments, the composite material includes a first region including both the interlocking structure and the matrix, and a second region including the interlocking structure without the matrix. Alternatively or in combination, the composite material can include a first region including both the interlocking structure and the matrix, and a second region including the matrix without the interlocking structure.

The matrix can serve various functions in the composite material. For example, the matrix can exhibit different mechanical properties than the interlocking structure so as to modulate the overall properties of the composite material, as described further below. As another example, the matrix can be a filler that occupies most or all of the free spaces within the interlocking structure so the composite material is a solid, continuous material. In a further example, the matrix can cover at least the exterior regions of the interlocking structure so the outer surface of the composite material (e.g., surface that will be in contact with the patient's body) is smooth and continuous. In other embodiments, however, the matrix is optional and can be omitted.

The interlocking structure can have different material properties than the matrix. For example, the interlocking structure can differ from the matrix with respect to one or more of the following material properties: modulus (e.g., flexural modulus, elastic modulus), glass transition temperature, elongation to break, elongation to yield, strength, hardness, scratch resistance, roughness, degradability, color, refractive index, transparency, porosity, morphology, chemical composition, degree of polymerization, crosslink density, phase, crystallinity, morphology, permeability, hydrophobicity, oleophobicity, and/or swellability.

In some embodiments, the interlocking structure has a higher modulus than the matrix. For example, the modulus of the interlocking structure can be at least 200 MPa, 500 MPa, 1 GPa, 2 GPa, 3 GPa, 4 GPa, 5 GPa, 10 GPa, 20 GPa, 30 GPa, 40 GPa, 50 GPa, 75 GPa, 100 GPa, 125 GPa, or 150 GPa; and/or the modulus of the matrix can be no more than 10 GPa, 5 GPa, 4 GPa, 3 GPa, 2 GPa, 1 GPa, 500 MPa, 400 MPa, 300 MPa, 200 MPa, or 100 MPa. Alternatively, the matrix can have a higher modulus than the interlocking structure, such that the moduli ranges provided above can be reversed. The difference between the modulus of the interlocking structure and the modulus of the matrix can be at least 500 MPa, 1 GPa, 5 GPa, 10 GPa, 50 GPa, 100 GPa, or 150 GPa; and/or less than 500 MPa, 250 MPa, or 100 MPa; and/or within a range from 250 MPa to 500 MPa, or from 500 MPa to 5 GPa, or from 1 GPa to 150 GPa.

As another example, the interlocking structure can have a higher glass transition temperature ($T_g$) than the matrix. For example, the $T_g$ of the interlocking structure can be at least at least 50° C., 75° C., 80° C., 100° C., 125° C., 150° C., 175° C., or 200° C.; and the $T_g$ of the matrix can be no more than 175° C., 150° C., 125° C., 100° C., 80° C., or 75° C. Alternatively, the matrix can have a higher $T_g$ than the interlocking structure, such that the $T_g$ ranges provided above can be reversed. The difference between the $T_g$ of the interlocking structure and the $T_g$ of the matrix can be at least 5° C., 10° C., 15° C., 20° C., 25° C., 30° C., 35° C., 40° C., 45° C., or 50° C. In other embodiments, the interlocking structures and/or matrix can be made partially or entirely out of a material that does not have a $T_g$ (e.g., the material decomposes or melts without undergoing a glass transition).

In another example, the interlocking structure can exhibit a different hydrophilicity and/or swellability than the matrix. In some embodiments, the interlocking structure is more hydrophilic and/or swellable than the matrix, while in other embodiments, the interlocking structure is less hydrophilic and/or swellable than the matrix. When exposed to a fluid (e.g., water), the interlocking structure and matrix can each independently exhibit at least 5 wt %, 10 wt %, 25 wt %, 50 wt %, or 100 wt % of fluid absorption. The ability of the interlocking structure and/or matrix to absorb water can be used to modulate the characteristics of these components over time when exposed to the intraoral environment (or other environments where fluids are present).

In some embodiments, the interlocking structure is made out of at least one first material, and the matrix is made out of at least one second, different material. The first material can have different properties than the second material, such as a difference in one or more of the following: modulus (e.g., flexural modulus, elastic modulus), glass transition temperature, elongation to break, elongation to yield, strength, hardness, scratch resistance, roughness, degradability, color, refractive index, transparency, porosity, morphology, chemical composition, degree of polymerization, crosslink density, phase, crystallinity, morphology, permeability, hydrophobicity, oleophobicity, and/or swellability. For example, the first material can have a higher modulus than the second material, or vice-versa. The moduli of the first and second materials can correspond to the moduli of the interlocking structure and matrix, respectively, as described above. As another example, the first material can have a higher $T_g$ than the second material, or vice-versa. The $T_g$ values of the first and second materials can correspond to the $T_g$ values of the interlocking structure and matrix, respectively, as described above.

Optionally, the first and second materials can be selected so that the resulting composite material is translucent or transparent. Translucency and transparency can be inversely correlated to the amount of scattering within the material, and scatter can depend on both refractive index and the size of features (e.g., interlocking elements) within the material. For composite materials including feature sizes (e.g., maximum spatial dimension) of less than 1 μm, scattering can decrease with further reductions in feature size below 1 μm. For composite materials with feature sizes greater than 5 μm, scattering can decrease with further increases in feature size due to fewer interfaces between the first and second materials. In embodiments where transparency is desired, the first and second materials can be selected to have the same or closely matching refractive indices (e.g., the difference in refractive indices is within a range from 0.1 to 0.3, and/or the refractive index contrast is no more than 0.05, 0.01, or 0.005). In some embodiments, the composite materials herein can include larger feature sizes (e.g., larger interlocking elements) and can be made out of materials having more closely matching refractive indices to provide fewer interfaces that can cause diffraction, refraction, and/or scatter.

Alternatively, the interlocking structure and the matrix can be made out of the same material (e.g., a single material or a single set of materials). In such embodiments, the different properties of the interlocking structure and the matrix can be produced by varying the local characteristics of the material, such as the crosslink density, degree of curing (e.g., degree of polymerization, double bond conversion), phase, crystallinity, morphology, and/or composition (e.g., constituent ratios). For example, the interlocking structure can correspond to a first region of the material, and the matrix can correspond to a second, different region of the material. The first region can have a higher modulus than the second region, or vice-versa. The moduli of the first and second regions can correspond to the moduli of the interlocking structure and matrix, respectively, as described above. As another example, the first region can have a higher $T_g$ than the second region, or vice-versa. The $T_g$ values of the first and second regions can correspond to the $T_g$ values of the interlocking structure and matrix, respectively, as described above.

In some embodiments, there is a sharp transition in materials and/or properties at the boundaries between the interlocking structure and the matrix, with little or no blending of materials and/or properties at the interfaces. In other embodiments, there can be an interface region between the interlocking structure and matrix that provides a gradual transition between the materials and/or properties of the interlocking structure and the matrix. For example, the interlocking structure can be made from a first material, the matrix can be made from a second material, and the interface region can be made from a combination of the first and second materials. As another example, the interlocking structure can have a first set of properties (e.g., a first modulus), the matrix can have a second set of properties (e.g., a second modulus), and the interface region can have a third set of properties intermediate to the first and second sets of properties (e.g., a third modulus between the first and second moduli).

In some embodiments, the interlocking structure is made out of one or more of the following materials: ceramic, glass, metal, alloys, polystyrene, polyterephthalates, copolyesters, polyamides, or suitable combinations thereof. Optionally, the interlocking structure can be made partially or entirely out of a material suitable for use in an additive manufacturing process, such as a resin including one or more polymerizable components (e.g., monomers, oligomers, reactive polymers).

In some embodiments, the matrix is made out of one or more of the following materials: a rubber, an elastomer, a biopolymer, a degradable polymer, a water absorbing polymer, a polydimethyl siloxane derivative, a polybutadiene derivative, a polyurethane, or suitable combinations thereof. Optionally, the matrix can be made partially or entirely out of a material suitable for use in an additive manufacturing process, such as a resin including one or more polymerizable components (e.g., monomers, oligomers, reactive polymers).

The composite materials described herein can exhibit favorable mechanical properties that would be difficult to achieve in other types of materials, such as a homogeneous material (e.g., a material with a uniform composition and/or structure). For example, the composite materials described herein can exhibit a greater degree of toughness compared to homogenous materials. Toughness can correlate to the ability of a material to withstand a force without fracturing, and may be quantified as the area under the tensile stress-strain curve for the material. Homogenous materials may lack sufficient toughness for use in orthodontics. For example, homogeneous materials having sufficiently high moduli for applying repositioning forces to teeth are typically also brittle and/or lack flexibility, thus leading to durability issues.

In contrast, the composite materials of the present technology can exhibit both a sufficiently high modulus and/or stiffness for repositioning teeth, as well as sufficiently high flexibility to reduce the likelihood of breakage during handling, storage, and/or use. For example, the composite materials described herein can have an overall modulus (e.g., elastic and/or flexural modulus) of at least 500 MPa, 600 MPa, 700 MPa, 800 MPa, 900 MPa, 1000 MPa, 1100 MPa, 1200 MPa, 1300 MPa, 1400 MPa, 1500 MPa, 2 GPa, 3 GPa, 4 GPa, 5 GPa, 10 GPa, 50 GPa, 75 GPa, 100 GPa, 125 GPa, or 150 GPa. In some embodiments, the composite materials described herein can exhibit increased toughness in that the higher modulus component(s) (e.g., the interlocking structure) may break, but the lower modulus component(s) (e.g., the matrix) can continue to hold the overall material together. Optionally, the higher modulus component(s) can be designed to intentionally break to add additional degrees of freedom of movement of the material. The lower modulus component(s) can serve as a safety feature to prevent broken components from being swallowed or otherwise causing injury.

Additionally, the composite materials described herein can exhibit complex behaviors that would be difficult to achieve with other types of materials. For example, the composite material can allow for a certain amount of bending before a resistive force is generated. Similarly, the composite material can allow for a certain amount of strain (e.g., under tension and/or compression) before resisting further strain. In some embodiments, the low modulus component(s) of the composite material (e.g., the matrix) allow for a predetermined amount of relatively unconstrained motion with low force in the composite material, before the high modulus component(s) (e.g., the interlocking structure) become engaged to provide a resistive force against further motion, thus producing a non-linear stress-strain profile, as described in greater detail below. The complex behaviors of the composite materials described herein can provide advantages that are not achievable with conventional materials. For example, conventional materials that have a high modulus are typically brittle with a very low elongation to break, whereas the composite materials herein can extend the elongation to any desired value before the high modulus component(s) become engaged, thereby increasing the elongation to break of the composite material. As another example, the composite materials described herein can exhibit an initial high modulus response that drops to a low modulus response after a certain strain is reached.

Optionally, the composite materials described herein can provide other functions, as an alternative to or in combination with applying force. Examples of such functions include, but are not limited to: releasing agents (e.g., therapeutic substances, flavors, odor eliminators, compliance indicators), aesthetics, serving as part of an auxiliary device, serving as electrical circuitry (e.g., the interlocking structure can be made out of an electrically conductive material), and/or fluid containment (e.g., for sensing, pneumatic applications).

FIG. 1A is a perspective view of a dental appliance ("appliance 100") configured in accordance with embodiments of the present technology. The appliance 100 includes an appliance body 102 made partially or entirely from a composite material 104 including an interlocking structure 106 and a matrix 108. Although the composite material 104, interlocking structure 106, and matrix 108 are illustrated as being similar to the embodiment of FIG. 2A described below, this is not intended to be limiting, and the composite material 104, interlocking structure 106, and matrix 108 can be any of the other embodiments described herein.

The appliance body 102 can be or include a shell including a plurality of teeth-receiving cavities configured to be worn on a patient's teeth. In some embodiments, the entire appliance body 102 is made out of the composite material 104. In other embodiments, only certain portions of the appliance body 102 are made out of the composite material 104, and the remaining portions of the appliance body 102 are made out of a different type of material (e.g., a homogeneous material, such as the matrix 108 without the interlocking structure 106). For example, the composite material 104 can be localized to one or more of the following portions of the appliance body 102: a portion adjacent or proximate to one or more teeth (e.g., one or more teeth to be repositioned by the appliance 100), a portion spaced apart from one or more teeth (e.g., away from one or more teeth to be repositioned by the appliance 100), a portion adjacent or proximate to the palate, a portion adjacent or proximate to an attachment, an outer portion (e.g., an outer surface away from the received teeth), an inner portion (e.g., an inner surface proximate to the received teeth), a distal portion, a mesial portion, an occlusal portion, a gingival portion, an interproximal portion, a buccal portion, a lingual portion, and/or suitable combinations thereof.

In some embodiments, the appliance body 102 includes a plurality of appliance portions, and some or all of the appliance portions are made out of different types of composite materials 104. For example, the appliance body 102 can include two, three, four, five, six, seven, eight, nine, 10, 20, 30, 40, 50, or more appliance portions that are made out of different types of composite materials 104. The appliance portions can differ from each other with respect to one or more of the following: the geometry of the interlocking structure 106 (e.g., size, shape, type of interlocking elements, density of interlocking elements), the material(s) used to form the interlocking structure 106, the properties of the interlocking structure 106, the material(s) used to form the matrix 108, the properties of the matrix 108, whether the matrix 108 is present, the overall properties of the composite material 104, and/or suitable combinations thereof. Each of the appliance portions can be independently selected from one or more of the following: a portion adjacent or proximate to one or more teeth (e.g., one or more teeth to be repositioned by the appliance 100), a portion spaced apart from one or more teeth (e.g., away from one or more teeth to be repositioned by the appliance 100), a portion adjacent or proximate to the palate, a portion adjacent or proximate to an attachment, an outer portion (e.g., an outer surface away from the received teeth), an inner portion (e.g., an inner surface proximate to the received teeth), a distal portion, a mesial portion, an occlusal portion, a gingival portion, an interproximal portion, a buccal portion, a lingual portion, and/or suitable combinations thereof.

Figure 1B:
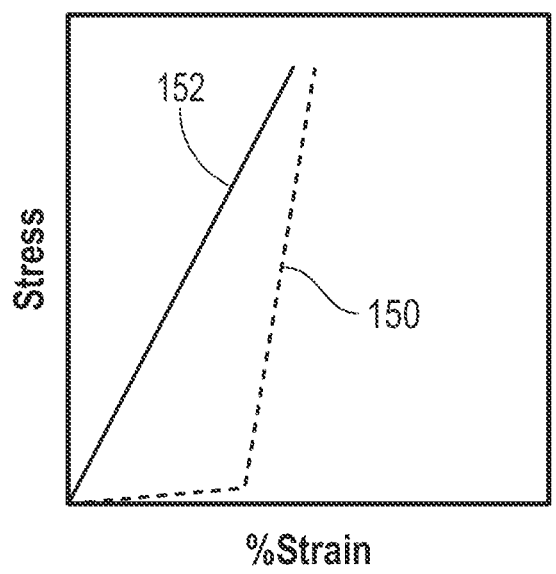
FIG. 1B is a graph illustrating a comparison between a stress-strain profile of a composite material and a stress-strain profile of a homogenous material, in accordance with embodiments of the present technology.

The portions of the appliance body 102 that include the composite material 104 with the interlocking structure 106 can exhibit a stress-strain profile that differs from stress-strain profiles associated with conventional homogenous materials. For example, FIG. 1B is a graph illustrating a comparison between a stress-strain profile 150 of a composite material and a stress-strain profile 152 of a homogenous material, in accordance with embodiments of the present technology. As shown in FIG. 1B, conventional homogenous materials lacking interlocking structures may exhibit a linear stress-strain profile 152, e.g., the amount of stress and/or force in the material increases linearly with increasing strain. In contrast, the composite materials described herein (e.g., the composite material 104 of FIG. 1A) can exhibit a nonlinear stress-strain profile 150 in which little or no stress and/or force is produced for a first strain range, then a larger stress and/or force is produced for a second strain range exceeding the first strain range. In some embodiments, the first strain range corresponds to relatively unconstrained movement of interlocking elements within the interlocking structure 106, and the second strain range corresponds to constrained movement of the interlocking elements within the interlocking structure 106, as described herein.

Referring again to FIG. 1A, although the appliance 100 is depicted as an orthodontic shell appliance (e.g., an aligner), in other embodiments, the appliance 100 can be any dental device or object configured to be worn on a patient's teeth, such as a palatal expander, retainer, mouth guard (e.g., sports guard, night guard), attachment placement device, or an attachment. For instance, in the context of aligners and retainers, the composite materials described herein can provide complementary forces (e.g., tension and/or compression forces) to help rotate, tilt, and/or otherwise move teeth. The composite materials described herein can also form part or all of a functional component that may or may not provide repositioning forces. Such functional components include, but are not limited to, hooks, buttons, components that interact with other devices (e.g., the composite material can serve as the capacitive element for a sensor or electronic compliance indicator), etc.

In the context of palatal expanders, the composite materials described herein can provide spring-like compressive forces to provide lower insertion force, yet retain a high and/or constant force for opening the palatal suture. For example, the composite materials herein can include an interlocking structure made out of high modulus materials that are conventionally considered too brittle for use. This approach allows such high modulus materials to be rendered more flexible, without compromising their ability to provide large forces.

In the context of mouth guards, the composite materials described herein can be configured to absorb forces to reduce or prevent damage to the patient's teeth and/or gums. For example, the interlocking structures can be configured to redirect applied forces along a different direction (e.g., perpendicular to the direction of the applied force) to dissipate energy, and/or to spread the force out over a larger area to reduce the impact to an individual tooth.

Additional examples and features of dental appliances suitable for use with the present technology are provided in Section III below.

Figure 2A:
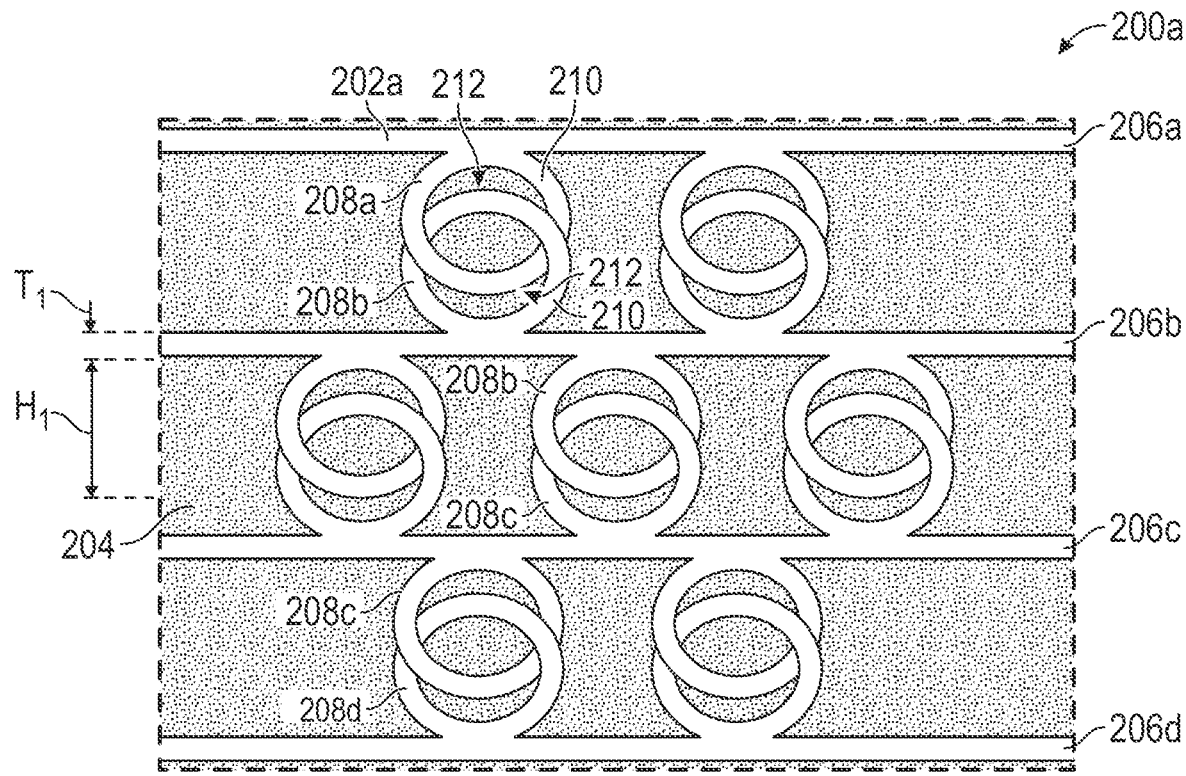
FIG. 2A is a cross-sectional side view of a composite material configured in accordance with embodiments of the present technology.

FIG. 2A is a cross-sectional side view of a composite material 200a configured in accordance with embodiments of the present technology. The composite material 200a includes an interlocking structure 202a and a matrix 204. The interlocking structure 202a can include a plurality of discrete portions (e.g., tens, hundreds, or thousands of portions) that are coupled to each other via a plurality of interlocking elements. The portions can be or include layers (e.g., flat layer, curved layers), elongate members (e.g., linear, curved, or curvilinear members), or any other suitable substructure of the interlocking structure 202a. For example, in the illustrated embodiment, the interlocking structure 202a includes a first portion 206a, a second portion 206b, a third portion 206c, and fourth portion 206d (collectively, "portions 206"). Although the portions 206 are illustrated as being parallel layers or elongate members, this is not intended to be limiting, and the portions 206 can have different geometries in other embodiments.

Each portion 206 can include a respective set of interlocking elements, e.g., the first portion 206a includes a set of first interlocking elements 208a, the second portion 206b includes a set of second interlocking elements 208b, the third portion 206c includes a set of third interlocking elements 208c, and the fourth portion 206d includes a set of fourth interlocking elements 208d (collectively, "interlocking elements 208"). As shown in FIG. 2A, each interlocking element 208 of a portion 206 extends towards and is coupled to a corresponding interlocking element 208 of a neighboring portion 206. Accordingly, each portion 206 can be connected to the neighboring portions 206 via the couplings between the respective interlocking elements 208. For example, the first portion 206a is coupled to the second portion 206b via the first interlocking elements 208a and the second interlocking elements 208b, the second portion 206b is coupled to the third portion 206c via the second interlocking elements 208b and the third interlocking elements 208c, and the third portion 206c is coupled to the fourth portion 206d via the third interlocking elements 208c and the fourth interlocking elements 208d.

In the illustrated embodiment, the interlocking elements 208 each include an annular member 210 (e.g., a ring, loop) with an aperture 212. Pairs of interlocking elements 208 can thus be interlinked with each other, in that a portion of the annular member 210 of each interlocking element 208 passes through the aperture 212 of the other interlocking element 208 in the pair. Although FIG. 2A depicts the annular member 210 and aperture 212 as having circular shapes, in other embodiments, the annular member 210 and aperture 212 can each independently have any of the following shapes: oval, triangular, square, rectangular, diamond, trapezoidal, a polygonal shape, a curved shape, or suitable combinations thereof.

The dimensions of the portions 206 and interlocking elements 208 can be varied as desired. For example, each portion 206 can have a thickness $T_1$ (or height) within a range from 1 μm to 500 μm, 1 μm to 100 μm, 1 μm to 50 μm, 1 μm to 25 μm, 1 μm to 10 μm, to 100 μm, 10 μm to 50 μm, 10 μm to 25 μm, 10 μm to or 50 μm, 10 μm to 100 μm. Each interlocking element 208 can have a height $H_1$ within a range from 1 μm to 500 μm, 10 μm to 100 μm, 1 μm to 50 μm, 1 μm to 25 μm, 1 μm to 10 μm, 10 μm to 100 μm, 10 μm to 50 μm, 10 μm to 25 μm, 25 μm to 50 μm or 50 μm to 100 μm. Although FIG. 2A depicts the thickness $T_1$ as being less than the height $H_1$, in other embodiments, the thickness $T_1$ can be the same as the height $H_1$, or the thickness $T_1$ can be the greater than the height $H_1$.

The matrix 204 can surround at least a portion or the entirety of the interlocking structure 202a. In the illustrated embodiment, the matrix 204 fills all the spaces within the interlocking structure 202a, including spaces between the portions 206 and the interlocking elements 208. In other embodiments, the composite material 200a can include one or more regions with the interlocking structure 202a and without the matrix 204, and/or one or more regions with the matrix 204 only and without the interlocking structure 202a. Optionally, the matrix 204 can be omitted altogether.

In some embodiments, the geometry and configuration of the interlocking structure 202a shown in FIG. 2A constrain certain types of movements of the portions 206 relative to each other, while permitting other types of movements. For example, the interlocking structure 202a can constrain translational movements of the portions 206 along the x-, y-, and z-axes, as well as rotational movements of the portions 206 around the y- and z-axes. However, the geometry and configuration of the interlocking structure 202a can permit rotational movements around the x-axis. Accordingly, the composite material 200a can be relatively stiff to tensile and/or compressive forces applied along the x-, y-, and z-directions, as well as to bending forces around the y- and z-axes; but can be relatively flexible to bending forces around the x-axis.

As shown in FIG. 2A, when the composite material 200a is in a resting and/or unloaded state, the coupled pairs of interlocking elements 208 can be in close proximity to each other without directly contacting each other. For example, the interlinked annular members 210 can be spaced apart from each other by one or more gaps. As described elsewhere herein, the presence of gaps can influence the overall behavior of the composite material 200a, e.g., the portions 206 can move relative to each other (e.g., along and/or around the x-, y-, and/or z-axes) in a relatively unconstrained manner until the interlocking elements 208 come into contact with each other, at which point further motion can be constrained as discussed above. Thus, the composite material 200a can exhibit a non-linear stress-strain profile in which little or no stress and/or force is produced for an initial strain range, then a larger stress and/or force is produced for a subsequent strain range exceeding the initial strain range (e.g., as previously described in connection with FIG. 1B). In other embodiments, however, the interlocking elements 208 can be configured to be in direct contact with each other at one or more locations, even when the composite material 200a is in a resting and/or unloaded state, such that there are few or no gaps between coupled pairs of interlocking elements 208.

FIGS. 2B-2M illustrate additional examples of composite materials with interlocking structures configured in accordance with embodiments of the present technology. The features of the embodiments of FIG. 2B-2M can be generally similar to the embodiment of FIG. 2A. Accordingly, the following discussion of FIGS. 2B-2M will be limited to those features that differ from the embodiments of FIG. 2A. Additionally, although FIGS. 2B-2M illustrate interlocking structures with two portions coupled by interlocking elements, this is merely for purposes of simplicity, and the embodiments of FIGS. 2B-2M can include any suitable number of portions.

Figure 2B:
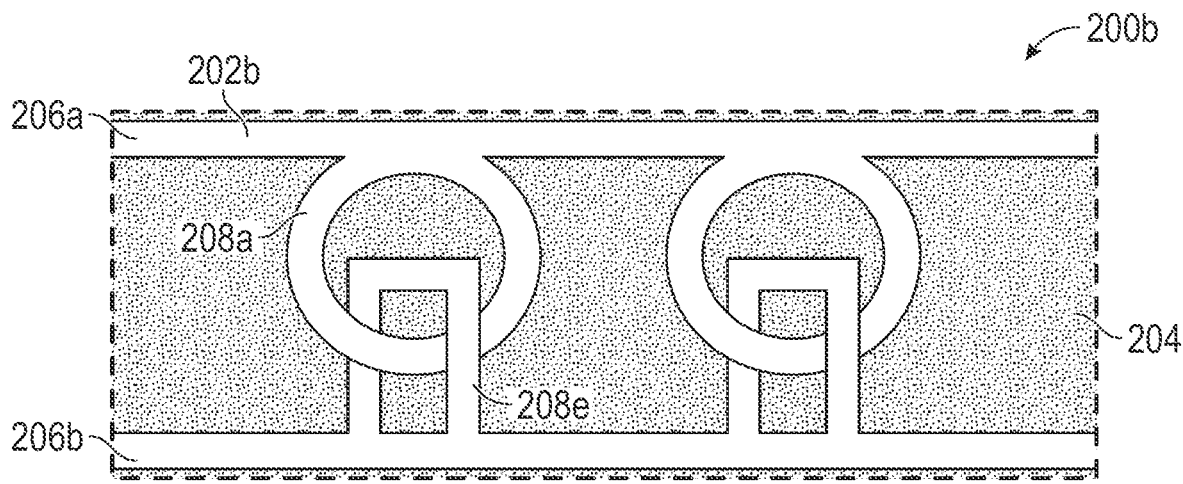
FIG. 2B is a cross-sectional side view of a composite material with different types of interlocking elements configured in accordance with embodiments of the present technology.

FIG. 2B is a cross-sectional side view of a composite material 200b configured in accordance with embodiments of the present technology. The composite material 200b includes an interlocking structure 202b embedded in a matrix 204. The composite material 200b can be generally similar to the composite material 200a of FIG. 2A, except that the interlocking structure 202b of the composite material 200b includes different types of interlocking elements. For example, the first portion 206a includes a set of first interlocking elements 208a have a first geometry (e.g., a circular shape), and the second portion 206b includes a set of second interlocking elements 208e having a second, different geometry (e.g., a rectangular shape). The first interlocking elements 208a and the second interlocking elements 208e can each independently have any of the following shapes: oval, triangular, square, rectangular, diamond, trapezoidal, a polygonal shape, a curved shape, or suitable combinations thereof. Alternatively or in combination, the first interlocking elements 208a and the second interlocking elements 208e can have different sizes (e.g., height, width).

Figure 2C:
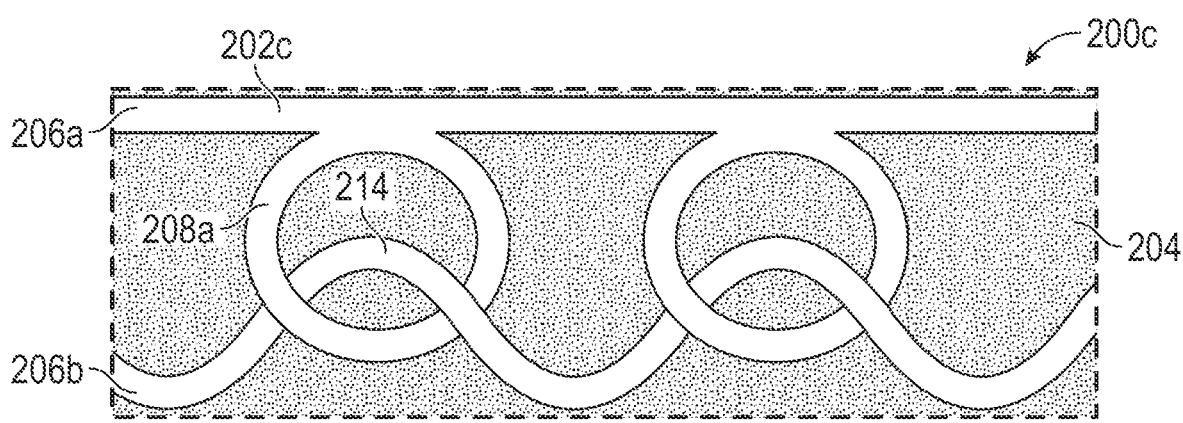
FIG. 2C is a cross-sectional side view of a composite material including an elongate member configured in accordance with embodiments of the present technology.

FIG. 2C is a cross-sectional side view of a composite material 200c configured in accordance with embodiments of the present technology. The composite material 200c includes an interlocking structure 202c embedded in a matrix 204. The interlocking structure 202c has a first portion 206a with a set of first interlocking elements 208a having an annular (e.g., circular) shape. The second portion 206b of the interlocking structure 202c can be an elongate member (e.g., strand, rod, filament, fiber) having a plurality of peaks 214 that serve as interlocking elements. Specifically, each peak 214 can pass through an aperture of a corresponding first interlocking element 208a of the first portion 206a, thus coupling the first portion 206a to the second portion 206b. This configuration can allow for more relative movement of the first portion 206a and the second portion 206b (e.g., along the x- and y-directions) compared to the embodiments of FIGS. 2A and 2B. In the illustrated embodiment, the second portion 206b has a curved shape (e.g., undulating, sinusoidal, and/or serpentine shape), such that the plurality of peaks 214 are rounded and/or curved. In other embodiments, the second portion 206b can be shaped differently, e.g., the second portion 206b can have a zig-zag shape with sharp peaks 214. Additionally, the peaks 214 may or may not be in direct contact with the first interlocking elements 208a when the composite material 200c is in a resting and/or unloaded state.

Figure 2D:
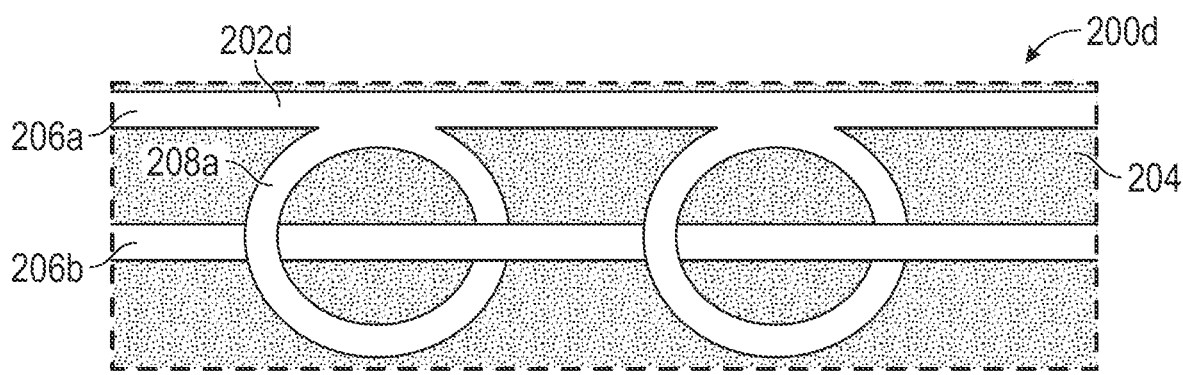
FIG. 2D is a cross-sectional side view of another composite material including an elongate member configured in accordance with embodiments of the present technology.

FIG. 2D is a cross-sectional side view of a composite material 200d configured in accordance with embodiments of the present technology. The composite material 200d includes an interlocking structure 202d embedded in a matrix 204. The interlocking structure 202d has a first portion 206a with a set of first interlocking elements 208a having an annular (e.g., circular) shape. The second portion 206b of the interlocking structure 202d can be an elongate member (e.g., strand, rod, filament, fiber) having a straightened, linear shape. The entirety of the second portion 206b can act as an interlocking element and can pass through the apertures of the first interlocking elements 208a of first portion 206a, thus coupling the first portion 206a to the second portion 206b. This configuration can allow the first portion 206a and second portion 206b to move freely along the x-direction, while constraining movement in the y- and z-directions. Optionally, the second portion 206b may or may not be in direct contact with the first interlocking elements 208a when the composite material 200d is in a resting and/or unloaded state.

Figure 2E:
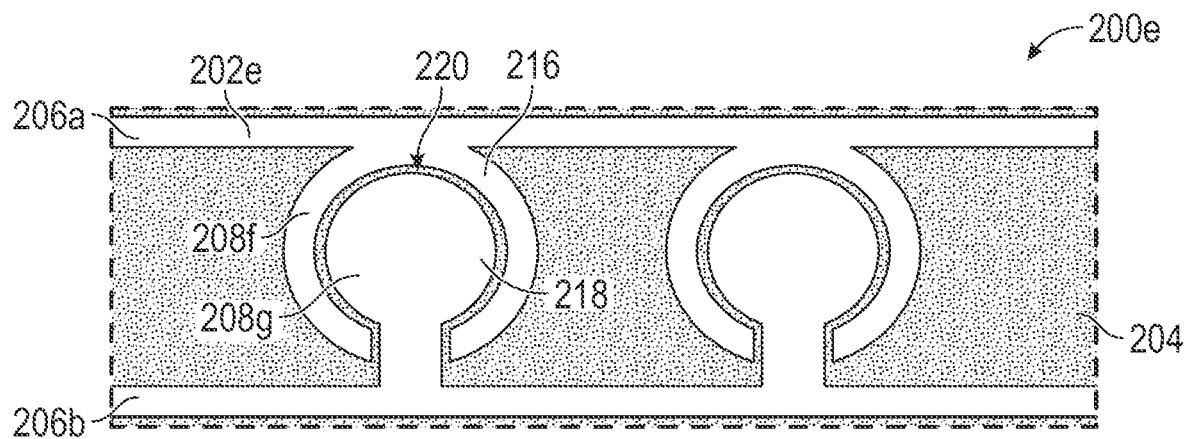
FIG. 2E is a cross-sectional side view of a composite material including interlocking elements with complementary shapes configured in accordance with embodiments of the present technology.

FIG. 2E is a cross-sectional side view of a composite material 200e configured in accordance with embodiments of the present technology. The composite material 200e includes an interlocking structure 202e embedded in a matrix 204. The interlocking structure 202e has a first portion 206a with a set of first interlocking elements 208f, and a second portion 206b with a set of second interlocking elements 208g. The first interlocking elements 208f and the second interlocking elements 208g can have complementary shapes. For example, as shown in FIG. 2E, each first interlocking element 208f is configured as a socket 216 having a concave inner surface, and each second interlocking element 208g includes a projection 218 having a convex outer surface that fits into and mates with a corresponding socket 216. Although the inner surface of the socket 216 and outer surface of the projection 218 are depicted as having complementary circular shapes, in other embodiments, the socket 216 and projection 218 can have different shapes, such as oval, triangular, square, rectangular, diamond, trapezoidal, a polygonal shape, a curved shape, or suitable combinations thereof.

In the illustrated embodiment, the concavity of the socket 216 is larger than the projection 218 such that when the composite material 200e is a resting and/or unloaded state, the inner surface of the socket 216 does not directly contact the outer surface of the projection 218. Thus, in the resting and/or unloaded state, there can be a gap 220 between the inner surface of the socket 216 and the outer surface of the projection 218. In other embodiments, however, one or more portions of the inner surface of the socket 216 can contact one or more adjacent portions of the outer surface of the projection 218, or the entire inner surface of the socket 216 can be in contact with the entire outer surface of the projection 218.

Figure 2F:
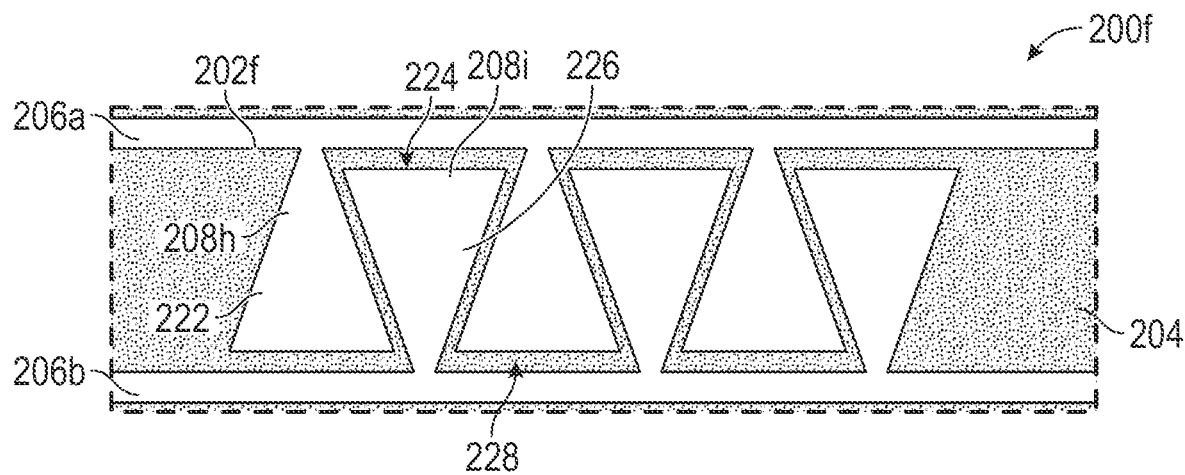
FIG. 2F is a cross-sectional side view of another composite material including interlocking elements with complementary shapes configured in accordance with embodiments of the present technology.

FIG. 2F is a cross-sectional side view of a composite material 200f configured in accordance with embodiments of the present technology. The composite material 200f includes an interlocking structure 202f embedded in a matrix 204. The interlocking structure 202f has a first portion 206a with a set of first interlocking elements 208h, and a second portion 206b with a set of second interlocking elements 208i. The first interlocking elements 208h can include a plurality of first projections 222 that are spaced apart from each other by a plurality of first recesses 224. Similarly, the second interlocking elements 208i can include a plurality of second projections 226 that are spaced apart from each other by a plurality of second recesses 228. The first projections 222 and the second recesses 228 can have complementary shapes, such that each first projection 222 is received within a corresponding second recess 228; and the second projections 226 and the first recesses 224 can have complementary shapes, such that each second projection 226 is received within corresponding first recess 224. As shown in FIG. 2F, the first and second projections 222, 226 can each have a narrower base that is connected to the respective portion 206a, 206b, and a wider free end that is positioned away from the respective portion 206a, 206b. Accordingly, movement of the first and second portions 206a, 206b along the y-direction can be constrained by the wider ends of the first and second projections 222, 226 obstructing each other.

In the illustrated embodiment, the first projections 222, first recesses 224, second projections 226, and second recesses 228 have complementary triangular shapes. In other embodiments, however, the first projections 222, first recesses 224, second projections 226, and second recesses 228 can have different shapes, such as circular, oval, square, rectangular, diamond, trapezoidal, a polygonal shape, a curved shape, or suitable combinations thereof. In some embodiments, the first projections 222 are smaller than the second recesses 228, and the second projections 226 are smaller than the first recesses 224. Accordingly, when the composite material 200f is in a resting and/or unloaded state, the first projections 222 and second projections 226 do not contact each other and are separated by gaps. In other embodiments, the first projections 222 and second projections 226 can be in contact with each other.

Figure 2G:
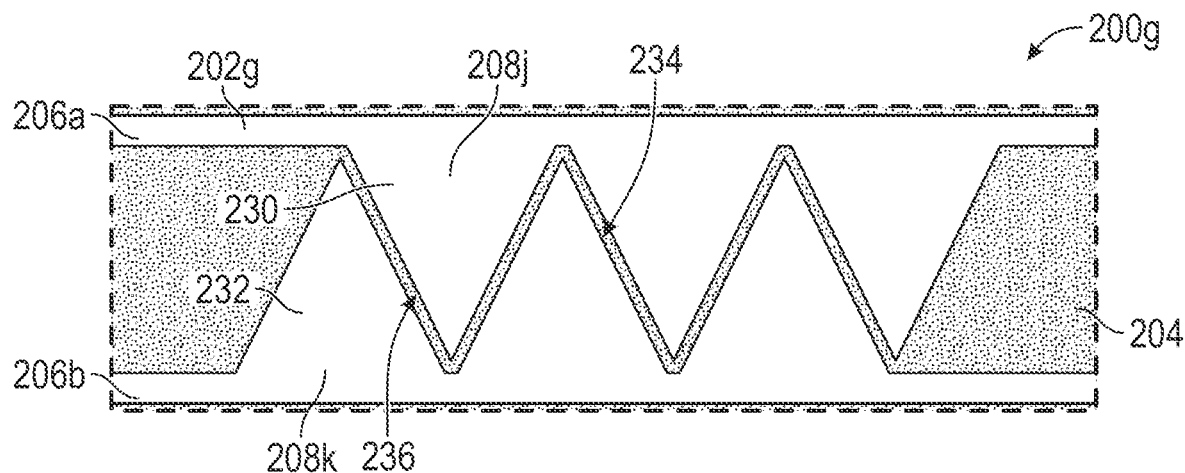
FIG. 2G is a cross-sectional side view of a composite material including interlocking elements and recesses with complementary shapes configured in accordance with embodiments of the present technology.

FIG. 2G is a cross-sectional side view of a composite material 200g configured in accordance with embodiments of the present technology. The composite material 200g includes an interlocking structure 202g embedded in a matrix 204. The interlocking structure 202g has a first portion 206a with a set of first interlocking elements 208j, and a second portion 206b with a set of second interlocking elements 208k. The first interlocking elements 208j can include a plurality of first projections 230 that are spaced apart from each other by a plurality of first recesses 234. Similarly, the second interlocking elements 208k can include a plurality of second projections 232 that are spaced apart from each other by a plurality of second recesses 236. The first projections 230 and the second recesses 236 can have complementary shapes, such that each first projection 230 is received within a corresponding second recess 236; and the second projections 232 and the first recesses 234 can have complementary shapes, such that each second projection 232 is received within corresponding first recess 234.

The interlocking structure 202g can be generally similar to the interlocking structure 202f of FIG. 2G, except that the orientations of the first projections 230 and second projections 232 are inverted. Specifically, the first and second projections 230, 232 can each have a wider base that is connected to the respective portion 206a, 206b, and a narrower free end that is positioned away from the respective portion 206a, 206b. Accordingly, movement of the first and second portions 206a, 206b along the y-direction can be less constrained compared to the embodiment of FIG. 2F.

Although the first projections 230, first recesses 234, second projections 232, and second recesses 236 are depicted as having complementary triangular shapes, in other embodiments, these components can have different shapes, such as circular, oval, square, rectangular, diamond, trapezoidal, a polygonal shape, a curved shape, or suitable combinations thereof. Additionally, although FIG. 2G shows the first projections 230 and second projections 232 as being separated by gaps, in other embodiments, the first projections 230 and second projections 232 can be in contact with each other.

Figure 2H:
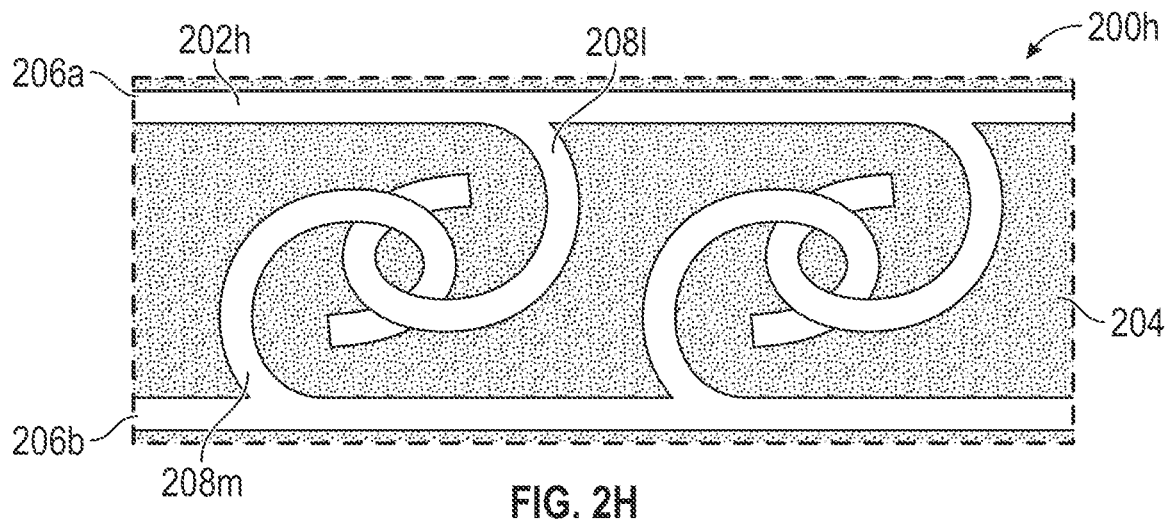
FIG. 2H is a cross-sectional side view of a composite material including elongate members configured in accordance with embodiments of the present technology.

FIG. 2H is a cross-sectional side view of a composite material 200h configured in accordance with embodiments of the present technology. The composite material 200h includes an interlocking structure 202h embedded in a matrix 204. The interlocking structure 202h has a first portion 206a with a set of first interlocking elements 208l, and a second portion 206b with a set of second interlocking elements 208m. The first interlocking elements 208l and second interlocking elements 208m can be elongate members (e.g., strands, filaments, fibers) that are intertwined, interwoven, coiled, entangled, and/or otherwise wrapped around each other. The elongate members can have any suitable shape (e.g., curved, linear, curvilinear, helical, spiral) and can be made out of any suitable combination of straight and/or curved segments. Although FIG. 2H depicts the first interlocking elements 208l and second interlocking elements 208m as being in close proximity without contacting each other, in other embodiments, the first interlocking elements 208l and second interlocking elements 208m can be in contact with each other.

Figure 2I:
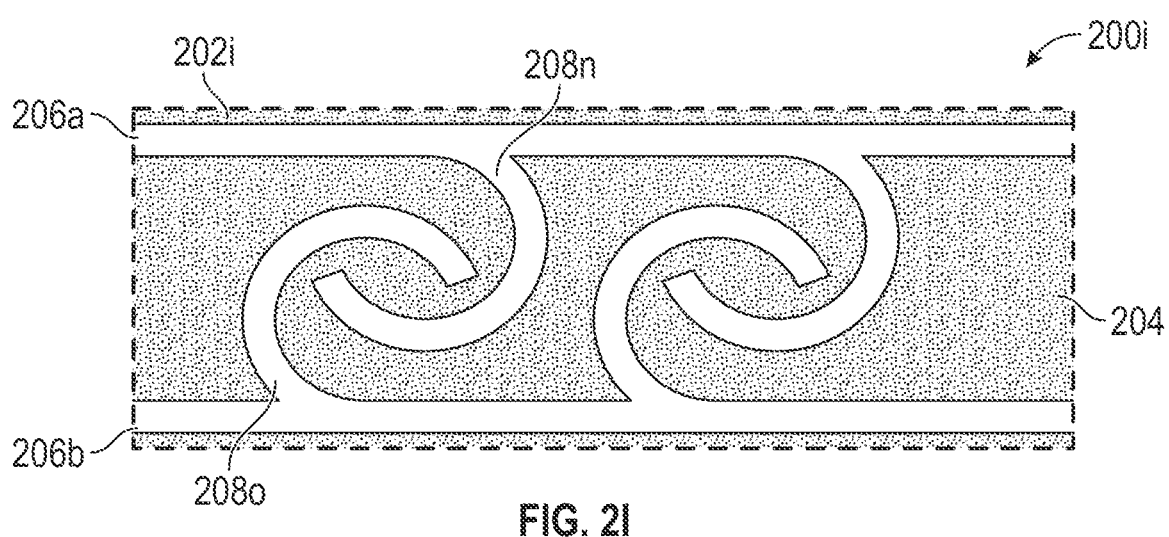
FIG. 2I is a cross-sectional side view of another composite material including elongate members configured in accordance with embodiments of the present technology.

FIG. 2I is a cross-sectional side view of a composite material 200i configured in accordance with embodiments of the present technology. The composite material 200i includes an interlocking structure 202i embedded in a matrix 204. The interlocking structure 202i has a first portion 206a with a set of first interlocking elements 208n, and a second portion 206b with a set of second interlocking elements 208o. The first interlocking elements 208n and second interlocking elements 208o can be elongate members (e.g., strands, filaments, fibers) having any suitable shape (e.g., curved, linear, curvilinear, helical, spiral) and made out of any suitable combination of straight and/or curved segments. When the composite material 200i is in a resting and/or unloaded state, the first interlocking elements 208n and second interlocking elements 208o can be positioned in close proximity to each other, but are not initially in contact with each other. However, when the composite material 200i is loaded (e.g., along the x-direction), the first interlocking elements 208n and second interlocking elements 208o can be brought into contact with each other to resist further loading. In other embodiments, the first interlocking elements 208n and second interlocking elements 208o can be in contact with each other even when the composite material 200i is in a resting and/or unloaded state.

Figure 2J:
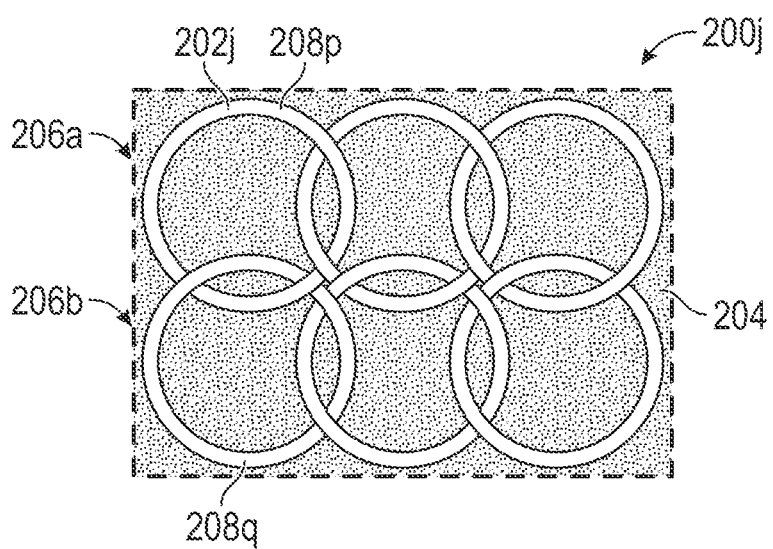
FIG. 2J is a cross-sectional side view of a composite material including discrete interlocking elements configured in accordance with embodiments of the present technology.

FIG. 2J is a cross-sectional side view of a composite material 200j configured in accordance with embodiments of the present technology. The composite material 200j includes an interlocking structure 202j embedded in a matrix 204. The interlocking structure 202j includes a plurality of discrete first interlocking elements 208p that are coupled to each other to form the first portion 206a, and a plurality of discrete second interlocking elements 208q that are coupled to each other to form the second portion 206b. In the illustrated embodiment, for example, the first interlocking elements 208p and second interlocking elements 208q are annular members (e.g., rings, loops) that are interlinked with each other to form the interlocking structure 202j. Although the first interlocking elements 208p and second interlocking elements 208q are depicted as being circular, in other embodiments, the first interlocking elements 208p and second interlocking elements 208q can each independently be any of the following shapes: oval, triangular, square, rectangular, diamond, trapezoidal, a polygonal shape, a curved shape, or suitable combinations thereof. Additionally, the first interlocking elements 208p and second interlocking elements 208q may or may not be separated from each other by gaps when the composite material 200j is in a resting and/or unloaded state.

Figure 2K:
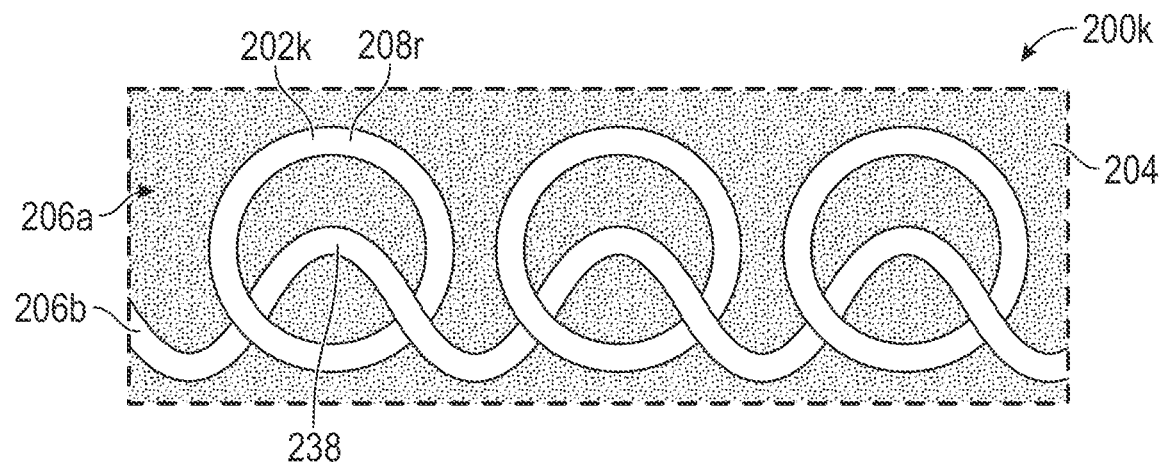
FIG. 2K is a cross-sectional side view of a composite material including discrete interlocking elements and an elongate member configured in accordance with embodiments of the present technology.

FIG. 2K is a cross-sectional side view of a composite material 200k configured in accordance with embodiments of the present technology. The composite material 200k includes an interlocking structure 202k embedded in a matrix 204. The interlocking structure 202k includes a first portion 206a composed of a plurality of first interlocking elements 208r (e.g., annular members such as loops or rings). As shown in FIG. 2K, the first interlocking elements 208r can be discrete components that are not coupled to each other. In other embodiments, however, the first interlocking elements 208r can be interlinked or otherwise coupled to each other (e.g., similar to the embodiment of FIG. 2J). Although the first interlocking elements 208r are depicted as being circular, in other embodiments, the first interlocking elements 208r can be any of the following shapes: oval, triangular, square, rectangular, diamond, trapezoidal, a polygonal shape, a curved shape, or suitable combinations thereof.

The second portion 206b of the interlocking structure 202k can be an elongate member (e.g., strand, rod, filament, fiber) having a plurality of peaks 238 that serve as interlocking elements. Specifically, each peak 238 can pass through an aperture of a corresponding first interlocking element 208r to couple the first portion 206a to the second portion 206b. In the illustrated embodiment, the second portion 206b has a curved shape (e.g., undulating, sinusoidal, and/or serpentine shape), such that the plurality of peaks 238 are rounded and/or curved. In other embodiments, the second portion 206b can be shaped differently, e.g., the second portion 206b can have a zig-zag shape with sharp peaks 238. Additionally, the peaks 238 may or may not be in direct contact with the first interlocking elements 208r when the composite material 200k is in a resting and/or unloaded state.

Figure 2L:
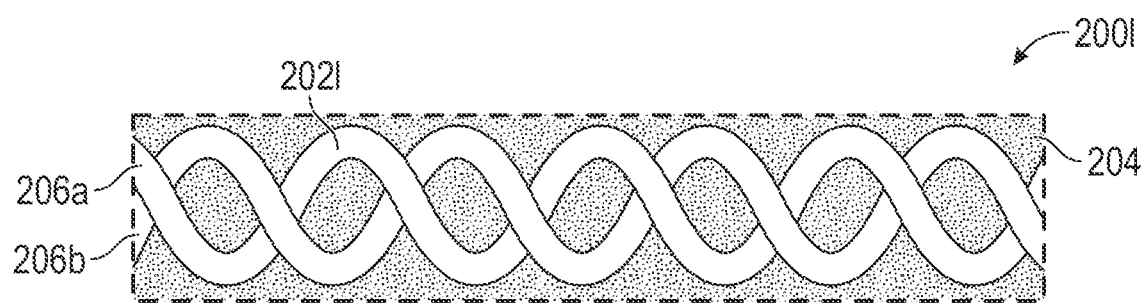
FIG. 2L is a cross-sectional side view of a composite material including intertwined elongate members configured in accordance with embodiments of the present technology.

FIG. 2L is a cross-sectional side view of a composite material 200l configured in accordance with embodiments of the present technology. The composite material 200l includes an interlocking structure 202l embedded in a matrix 204. The interlocking structure 202l includes a first portion 206a and a second portion 206b that are elongate members (e.g., strands, filaments, fibers) that are intertwined, interwoven, or otherwise wrapped around each other, and thus function as interlocking elements. Although the first portion 206a and second portion 206b are depicted as having a helical and/or spiral shape, the first portion 206a and second portion 206b can have any suitable shape (e.g., curved, linear, curvilinear) and made out of any suitable combination of straight and/or curved segments. The first portion 206a and second portion 206b may or may not be in contact with each other when the composite material 200l is in a resting and/or unloaded state.

Figure 2M:
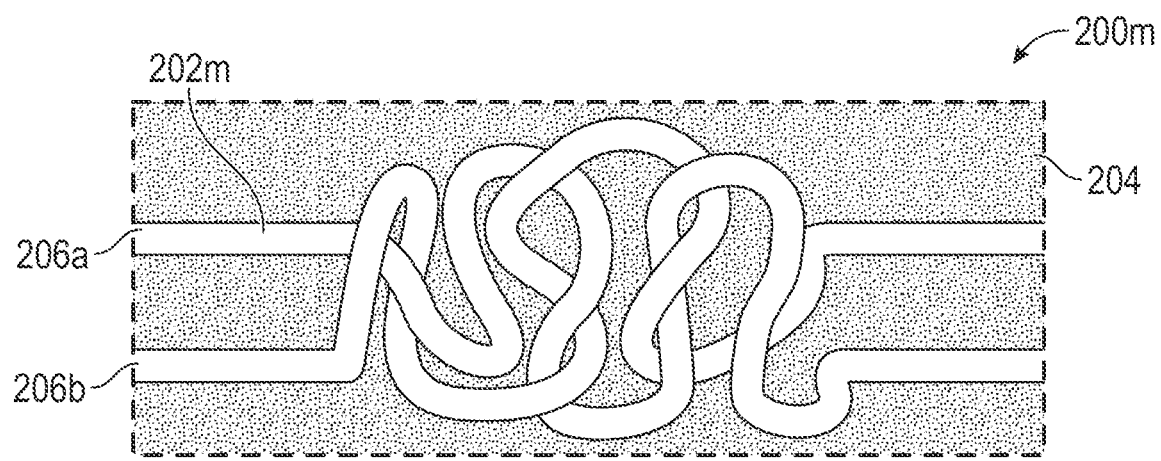
FIG. 2M is a cross-sectional side view of a composite material including entangled elongate members configured in accordance with embodiments of the present technology.

FIG. 2M is a cross-sectional side view of a composite material 200m configured in accordance with embodiments of the present technology. The composite material 200k includes an interlocking structure 202m embedded in a matrix 204. The interlocking structure 202m includes a first portion 206a and a second portion 206b that are elongate members (e.g., strands, filaments, fibers) that are entangled with each other, and thus function as interlocking elements Although FIG. 2M shows only a portion of the first portion 206a and second portion 206b as being entangled with each other, in other embodiments, the entirety of the first portion 206a and second portion 206b can be entangled with each other. The first portion 206a and second portion 206b may or may not be in contact with each other when the composite material 200l is in a resting and/or unloaded state.

Any of the features described above in connection with any of the embodiments of FIGS. 2A-2M can be combined with or substituted for any of the features of any other embodiment of FIGS. 2A-2M. Moreover, although FIGS. 2A-2M each illustrate interlocking structures with a single type of interlocking connection, in other embodiments, an interlocking structure can include multiple types of interlocking connections. For example, a single portion (e.g., layer) of an interlocking structure can include multiple types of interlocking elements (e.g., two, three, four, five, or more different types of interlocking elements), which can each independently be selected from any of the embodiments described herein. Additionally, although the composite materials of FIGS. 2A-2M are each depicted as including a matrix, in other embodiments, the matrix can be omitted.

The composite materials described herein, selected components thereof (e.g., interlocking structures and/or matrices), and/or devices made of the composite materials described herein (collectively, "objects") can be fabricated using a wide variety of additive manufacturing techniques. Examples of additive manufacturing techniques include, but are not limited to, the following: (1) vat photopolymerization, in which an object is constructed from a vat or other bulk source of liquid photopolymer resin, including techniques such as stereolithography (SLA), digital light processing (DLP), continuous liquid interface production (CLIP), two-photon induced photopolymerization (TPIP), and volumetric additive manufacturing; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) material extrusion, in which material is drawn through a nozzle, heated, and deposited layer-by-layer, such as fused deposition modeling (FDM) and direct ink writing (DIW); (5) powder bed fusion, including techniques such as direct metal laser sintering (DMLS), electron beam melting (EBM), selective heat sintering (SHS), selective laser melting (SLM), and selective laser sintering (SLS); (6) sheet lamination, including techniques such as laminated object manufacturing (LOM) and ultrasonic additive manufacturing (UAM); and (7) directed energy deposition, including techniques such as laser engineering net shaping, directed light fabrication, direct metal deposition, and 3D laser cladding. Optionally, an additive manufacturing process can use a combination of two or more additive manufacturing techniques.

For example, the objects described herein can be fabricated using a vat photopolymerization process in which light is used to selectively cure a vat or other bulk source of a curable material (e.g., a polymeric resin). Each layer of curable material can be selectively exposed to light in a single exposure (e.g., DLP) or by scanning a beam of light across the layer (e.g., SLA). Vat polymerization can be performed in a "top-down" or "bottom-up" approach, depending on the relative locations of the material source, light source, and build platform.

As another example, the objects described herein can be fabricated using high temperature lithography (also known as "hot lithography"). High temperature lithography can include any photopolymerization process that involves heating a photopolymerizable material (e.g., a polymeric resin). For example, high temperature lithography can involve heating the material to a temperature of at least 30° C., 40° C., 50° C., 60° C., 70° C., 80° C., 90° C., 100° C., 110° C., or 120° C. In some embodiments, the material is heated to a temperature within a range from 50° C. to 120° C., from 90° C. to 120° C., from 100° C. to 120° C., from 105° C. to 115° C., or from 105° C. to 110° C. The heating can lower the viscosity of the photopolymerizable material before and/or during curing, and/or increase reactivity of the photopolymerizable material. Accordingly, high temperature lithography can be used to fabricate objects from highly viscous and/or poorly flowable materials, which, when cured, may exhibit improved mechanical properties (e.g., stiffness, strength, stability) compared to other types of materials. For example, high temperature lithography can be used to fabricate objects from a material having a viscosity of at least 5 Pa-s, 10 Pa-s, 15 Pa-s, 20 Pa-s, 30 Pa-s, 40 Pa-s, or 50 Pa-s at 20° C. Representative examples of high-temperature lithography processes that may be incorporated in the methods herein are described in International Publication Nos. WO 2015/075094, WO 2016/078838, WO 2018/032022, WO 2020/070639, WO 2021/130657, and WO 2021/130661, the disclosures of each of which are incorporated herein by reference in their entirety.

In some embodiments, the objects described herein are fabricated using continuous liquid interphase production (also known as "continuous liquid interphase printing") in which the object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Representative examples of continuous liquid interphase production processes that may be incorporated in the methods herein are described in U.S. Patent Application Publication Nos. 2015/0097315, 2015/0097316, and 2015/0102532, the disclosures of each of which are incorporated herein by reference in their entirety.

As another example, a continuous additive manufacturing method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety. In another example, a continuous additive manufacturing method can involve extruding a composite material composed of a curable liquid material surrounding a solid strand. The composite material can be extruded along a continuous three-dimensional path in order to form the object. Such methods are described in U.S. Pat. No. 10,162,264 and U.S. Patent Application Publication No. 2014/0061974, the disclosures of which are incorporated herein by reference in their entirety. In yet another example, a continuous additive manufacturing method can utilize a "heliolithography" approach in which the liquid photopolymer is cured with focused radiation while the build platform is continuously rotated and raised. Accordingly, the object geometry can be continuously built up along a spiral build path. Such methods are described in U.S. Patent Application Publication No. 2014/0265034, the disclosure of which is incorporated herein by reference in its entirety.

In a further example, the objects described herein can be fabricated using a volumetric additive manufacturing (VAM) process in which an entire object is produced from a 3D volume of resin in a single print step, without requiring layer-by-layer build up. During a VAM process, the entire build volume is irradiated with energy, but the projection patterns are configured such that only certain voxels will accumulate a sufficient energy dosage to be cured. Representative examples of VAM processes that may be incorporated into the present technology include tomographic volumetric printing, holographic volumetric printing, multiphoton volumetric printing, and xolography. For instance, a tomographic VAM process can be performed by projecting 2D optical patterns into a rotating volume of photosensitive material at perpendicular and/or angular incidences to produce a cured 3D structure. A holographic VAM process can be performed by projecting overlapping light patterns into a stationary reservoir of photosensitive material. A xolography process can use photoswitchable photoinitiators to induce local polymerization inside a volume of photosensitive material upon linear excitation by intersecting light beams of different wavelengths. Additional details of VAM processes suitable for use with the present technology are described in U.S. Pat. No. 11,370,173, U.S. Patent Application Publication No. 2021/0146619, U.S. Patent Application Publication No. 2022/0227051, International Publication No. WO 2017/115076, International Publication No. WO 2020/245456, International Publication No. WO 2022/011456, and U.S. Provisional Patent Application No. 63/181,645, the disclosures of each of which are incorporated herein by reference in their entirety.

In yet another example, the objects described herein can be fabricated using a powder bed fusion process (e.g., selective laser sintering) involving using a laser beam to selectively fuse a layer of powdered material according to a desired cross-sectional shape in order to build up the object geometry. As another example, the objects described herein can be fabricated using a material extrusion process (e.g., fused deposition modeling) involving selectively depositing a thin filament of material (e.g., thermoplastic polymer) in a layer-by-layer manner in order to form an object. In yet another example, the objects described herein can be fabricated using a material jetting process involving jetting or extruding one or more materials onto a build surface in order to form successive layers of the object geometry.

The objects described herein can be made of any suitable material or combination of materials. In some embodiments, the objects described herein are made partially or entirely out of a polymeric material, such as a curable polymeric resin. The resin can be composed of one or more monomer components that are initially in a liquid state. The resin can be in the liquid at room temperature (e.g., 20° C.) or at an elevated temperature (e.g., a temperature within a range from 50° C. to 120° C.). When exposed to energy (e.g., light), the monomer components can undergo a polymerization reaction such that the resin solidifies into the desired object geometry. Representative examples of curable polymeric resins and other materials suitable for use with the additive manufacturing techniques herein are described in International Publication Nos. WO 2019/006409, WO 2020/070639, and WO 2021/087061, the disclosures of each of which are incorporated herein by reference in their entirety.

Optionally, the objects described herein can be fabricated from a plurality of different materials (e.g., at least two, three, four, five, or more different materials). The materials can differ from each other with respect to composition, curing conditions (e.g., curing energy wavelength), material properties before curing (e.g., viscosity), material properties after curing (e.g., stiffness, strength, transparency), and so on. In some embodiments, the additively manufactured object is formed from multiple materials in a single manufacturing step. For instance, a multi-tip extrusion apparatus can be used to selectively dispense multiple types of materials from distinct material supply sources in order to fabricate an object from a plurality of different materials. Examples of such methods are described in U.S. Pat. Nos. 6,749,414 and 11,318,667, the disclosures of which are incorporated herein by reference in their entirety. Alternatively or in combination, the objects described herein can be formed from multiple materials in a plurality of sequential manufacturing steps. For instance, a first portion of the object can be formed from a first material in accordance with any of the fabrication methods herein, then a second portion of the object can be formed from a second material in accordance with any of the fabrication methods herein, and so on, until the entirety of the object has been formed.

In some embodiments, the additive manufacturing process used to fabricate the interlocking structure is selected based on the printing resolution of the process and the targeted feature size of the interlocking elements. For example, the feature size of the interlocking elements (e.g., the smallest spatial dimension of the interlocking elements) can be the same as or similar to (e.g., within 10%) of the resolution of the additive manufacturing process. The selected additive manufacturing process can be a technique capable of achieving feature sizes less than or equal to 500 µm, 100 µm, 10 µm, 5 µm, or 1 µm. In some embodiments, FDM processes can have a resolution of about 50 µm; DLP, inkjet, and VAM processes can have a resolution of about 30 µm; laser-based processes (e.g., SLA) can have a resolution of about 5 µm; holographic interference processes (e.g., holography) can achieve resolutions on the order of hundreds of nanometers; and two-photon techniques (e.g., techniques using sequential or simultaneous absorption of two or more photons to selectively cure a material) can achieve resolutions on the order of nanometers.

In some embodiments, the additive manufacturing process used to fabricate the interlocking structure is capable of printing "floating islands," e.g., features that are spatially separated from each other features without underlying support structures. Such processes can be used in embodiments where the interlocking structure includes coupled interlocking elements that are in close proximity to each other but do not directly contact each other. For example, VAM processes and powder bed fusion processes can be used to form such interlocking structures. Alternatively or in combination, such interlocking structures can be produced by concurrently fabricating the interlocking structure with the surrounding matrix material, as described further below.

FIGS. 3A-5B illustrate methods 300-500 for fabricating composite materials, in accordance with embodiments of the present technology. The methods 300-500 can be used to fabricate any embodiment of the composite materials and/or associated devices (e.g., dental appliances) described herein. In some embodiments, some or all of the processes of the methods 300-500 are implemented as computer-readable instructions (e.g., program code) that are configured to be executed by one or more processors of a computing device (e.g., a controller of a manufacturing system). The methods 300-500 can be combined with each other and/or with any of the other methods described herein.

Figure 3A:
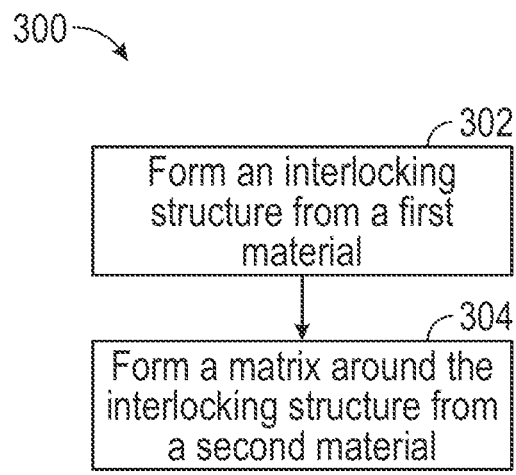
FIG. 3A is a flow diagram illustrating a method of fabricating a composite material, in accordance with embodiments of the present technology.
Figure 3B:
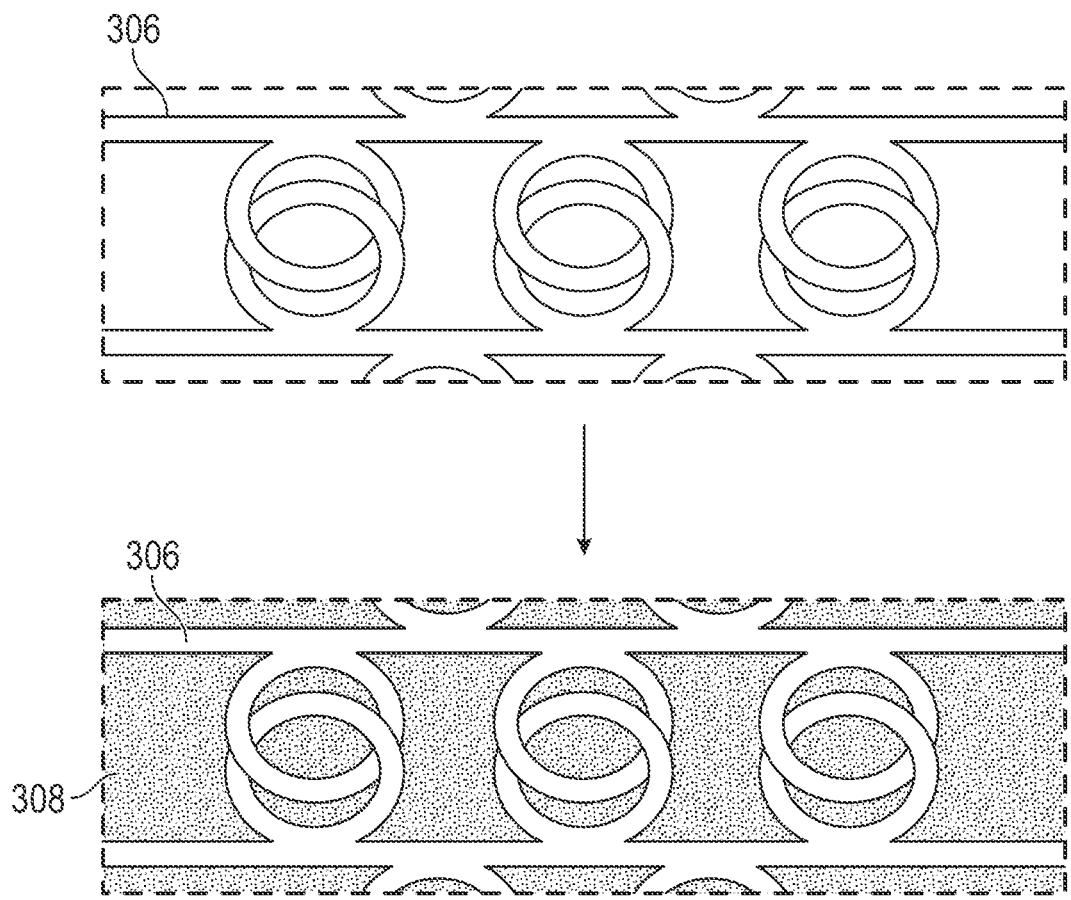
FIG. 3B illustrates selected processes of the method of FIG. 3A.

FIG. 3A is a flow diagram illustrating a method 300 of fabricating a composite material, and FIG. 3B illustrates selected processes of the method 300, in accordance with embodiments of the present technology. Referring to FIGS. 3A and 3B together, the method 300 begins at block 302 with forming an interlocking structure 306 from a first material. The interlocking structure 306 and the first material can be any of the embodiments described herein. In some embodiments, the interlocking structure 306 is fabricated using an additive manufacturing process, such as DLP, SLA, FDM, VAM (e.g., holography), inkjet, a two-photon technique, or any other suitable technique. Optionally, the additive manufacturing process can be selected based on the feature size of the interlocking elements of the interlocking structure 306 and/or based on the ability to print floating islands, as described above.

At block 304, the method 300 can continue with forming a matrix 308 around the interlocking structure 306 from a second material. The matrix 308 and second material can be any of the embodiments described herein. As discussed above, the matrix 308 can surround the entirety of the interlocking structure 306, or can surround only selected portions of the interlocking structure 306. The matrix 308 can be formed around the interlocking structure 306 in many ways. For example, the matrix 308 can be adhered to, infiltrated into, deposited on, and/or coated onto the interlocking structure 306. In such embodiments, the second material can initially be in a liquid or semi-liquid state to facilitate penetration into the spaces of the interlocking structure 306, and can subsequently be cured or otherwise solidified to form the matrix 308. This approach may be performed with or without using an additive manufacturing process.

As another example, the matrix 308 can be formed around the interlocking structure 306 via an additive manufacturing process, such as any of the processes described herein (e.g., DLP, SLA, FDM, VAM (e.g., holography), inkjet, a two-photon technique, or any other suitable technique). In some embodiments, the interlocking structure 306 is printed in a first additive manufacturing operation, and the matrix 308 is subsequently printed in situ around the interlocking structure 306 using a second additive manufacturing operation. The first and second additive manufacturing operations can use the same additive manufacturing technique, or can use different techniques. For example, VAM and/or inkjet techniques can be used to print the matrix 308 around the existing interlocking structure 306. Optionally, the interlocking structure 306 (or selected portions thereof) can be placed into the print at an appropriate time via a robotic arm or other automated mechanism, and the matrix 308 can then be printed around the structure.

Figure 4A:
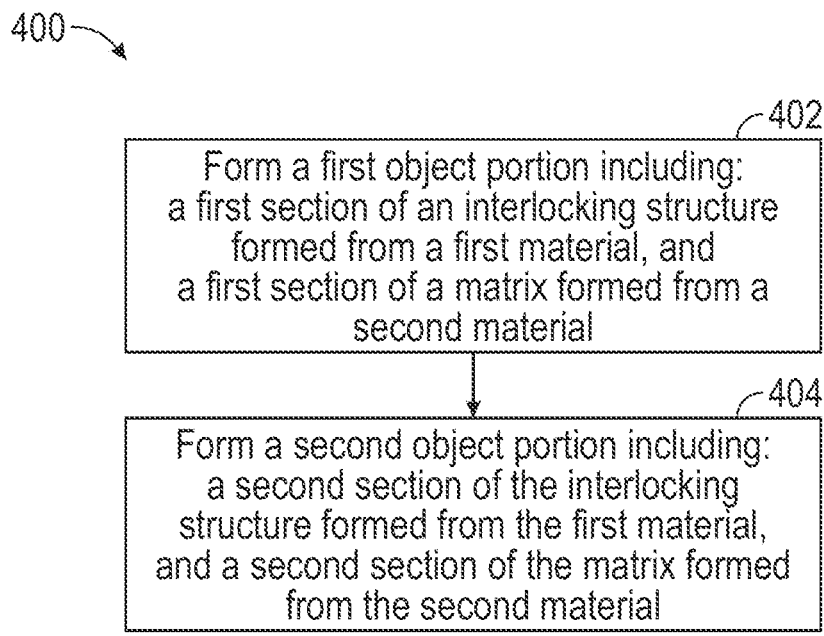
FIG. 4A is a flow diagram illustrating a method of fabricating a composite material, in accordance with embodiments of the present technology.
Figure 4B:
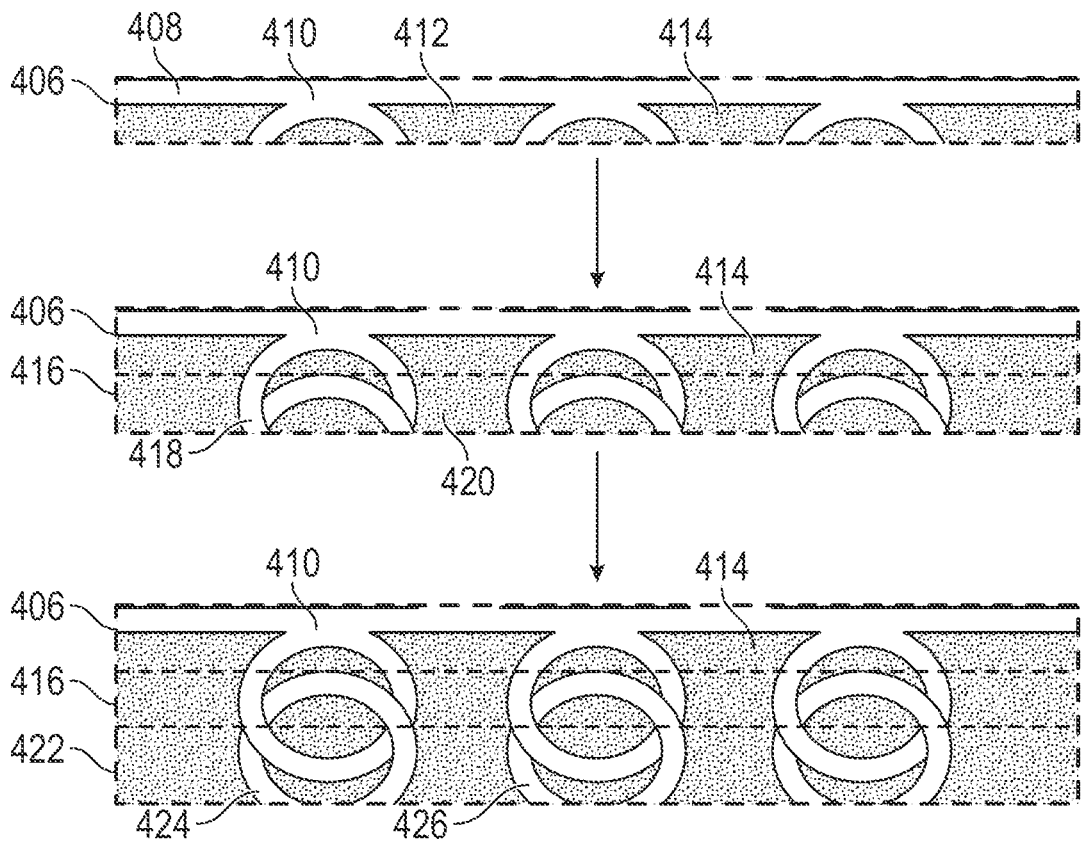
FIG. 4B illustrates selected processes of the method of FIG. 4A.

FIG. 4A is a flow diagram illustrating a method 400 of fabricating a composite material, and FIG. 4B illustrates selected processes of the method 400, in accordance with embodiments of the present technology. Referring to FIGS. 4A and 4B together, the method 400 begins at block 402 with forming a first object portion 406 (e.g., a first layer of the composite material). The first object portion 406 can include a first section 408 (e.g., a first layer) of an interlocking structure 410, and a first section 412 (e.g., a first layer) of a matrix 414. The first section 408 of the interlocking structure 410 can be formed from a first material, and the first section 412 of the matrix 414 can be formed from a second, different material. The interlocking structure 410, first material, matrix 414, and second material can be any of the embodiments described herein.

In some embodiments, the first section 408 of the interlocking structure 410 and the first section 412 of the matrix 414 are formed concurrently in a single manufacturing step or operation. For example, the first section 408 of the interlocking structure 410 and the first section 412 of the matrix 414 can be concurrently printed in the same additive manufacturing step or operation. This approach can involve using an additive manufacturing process capable of concurrently forming an object from multiple materials, including, but not limited to, material jetting processes (e.g., inkjet processes, Nordson EFD's PICO fllse), powder binding processes, multi-nozzle FDM processes, and/or hybrid processes (e.g., processes performed by additive manufacturing system that implements two or more different types of additive manufacturing techniques, such as an inkjet process and a resin-based photopolymerization process). Optionally, the additive manufacturing process can be selected based on the feature size of the interlocking elements of the interlocking structure 410, as described above.

At block 404, the method 400 can continue with forming a second object portion 416 (e.g., a second layer of the composite material). The second object portion 416 can be formed immediately above or below the first object portion 406. The second object portion 416 can include a second section 418 (e.g., second layer) of the interlocking structure 410, and a second section 420 (e.g., second layer) of the matrix 414. The second section 418 of the interlocking structure 410 can be formed from the first material, and the second section 420 of the matrix 414 can be formed from the second material. In some embodiments, the second section 418 of the interlocking structure 410 and the second section 420 of the matrix 414 are formed concurrently in a single manufacturing step or operation (e.g., the same additive manufacturing step or operation), as described above in connection with block 402.

This process can be repeated to form additional object portions (e.g., a third object portion 422 including a third section 424 of the interlocking structure 410 and a third section 426 of the matrix 414), thus building up the composite material in a layer-by-layer manner. For example, the composite material can be made out of tens, hundreds, or thousands of sequentially formed object portions.

Figure 5A:
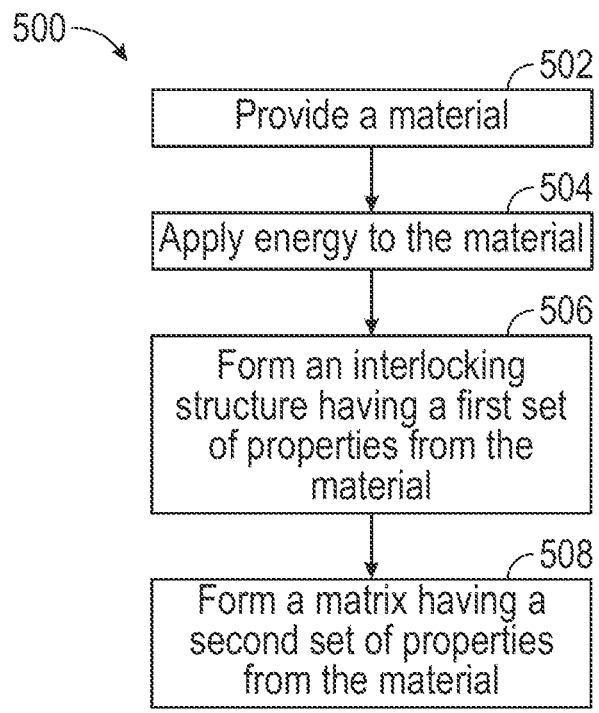
FIG. 5A is a flow diagram illustrating a method of fabricating a composite material, in accordance with embodiments of the present technology.
Figure 5B:
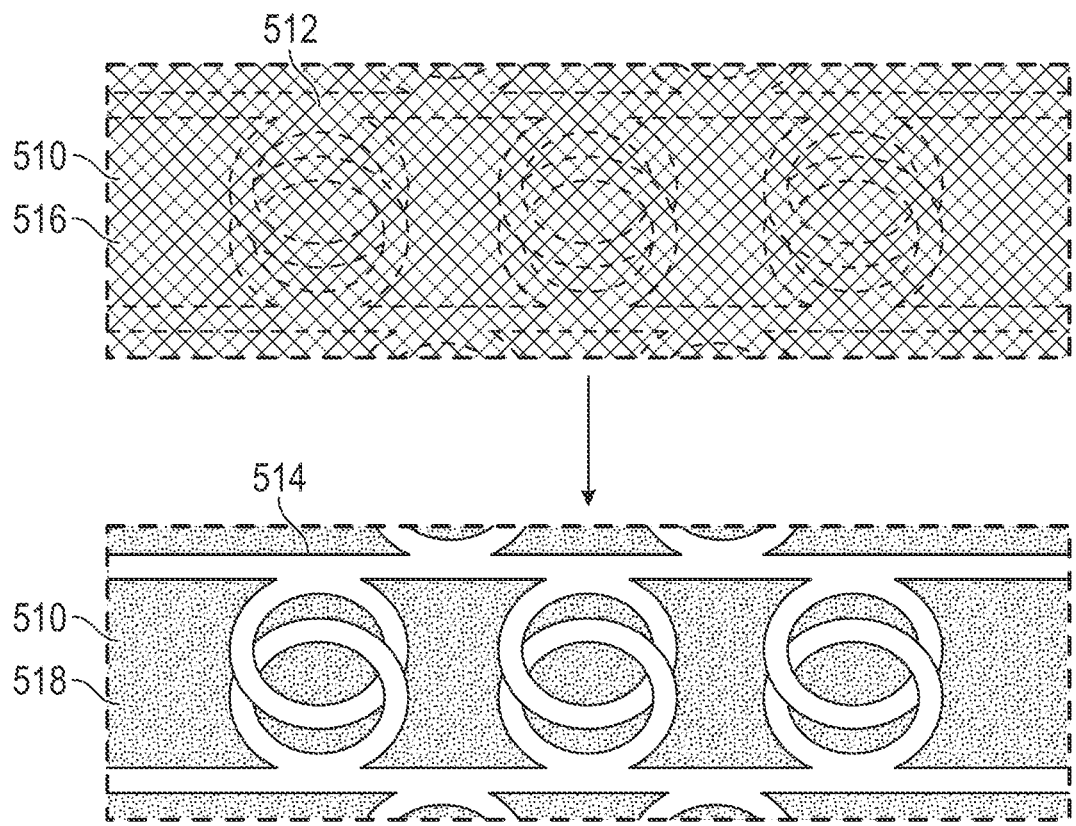
FIG. 5B illustrates selected processes of the method of FIG. 5A.

FIG. 5A is a flow diagram illustrating a method 500 of fabricating a composite material, and FIG. 5B illustrates selected processes of the method 500, in accordance with embodiments of the present technology. Referring to FIGS. 5A and 5B together, the method 500 begins at block 502 with providing a material 510. The material 510 can be a single, homogenous composition including one or more polymerizable components (e.g., monomers, oligomers, reactive polymers). Optionally, the material 510 can include various additives, such as catalysts, blockers, viscosity modifiers, fillers, binders, reactive diluents, solvents, pigments and/or dyes, stabilizers, surface-active compounds, etc. In some embodiments, the material 510 is positioned on a build platform for forming an object, e.g., as a thin, uniform layer having a thickness corresponding to a target layer thickness of the object.

At block 504, the method 500 can continue with applying energy to the material 510. The energy (e.g., light energy, thermal energy, radiation) can be configured to cure or otherwise solidify the material 510, e.g., by initiating polymerization of the one or more polymerizable components. The energy can be applied to a first region 512 corresponding to the locations of the interlocking structure 514, a second region 516 corresponding to the locations of the matrix 518, or both. The application of the energy can cause (1) formation of an interlocking structure 514 having a first set of properties (block 506) and (2) formation of a matrix 518 having a second, different set of properties (block 508). For example, the interlocking structure 514 and the matrix 518 can differ from each other with respect to one or more of the following properties: modulus, glass transition temperature, elongation to break, elongation to yield, strength, hardness, scratch resistance, roughness, degradability, color, refractive index, transparency, porosity, morphology, chemical composition, degree of polymerization, crosslink density, phase, crystallinity, morphology, permeability, hydrophobicity, oleophobicity, and/or swellability. Thus, the interlocking structure 514 and matrix 518 can both be formed from the same starting material 510, but nonetheless exhibit different properties in the resulting composite material. In some embodiments, the processes of blocks 504, 506, and 508 occur concurrently, e.g., the application of the energy in block 504 triggers formation of the interlocking structure 514 and matrix 518 at the same time. In other embodiments, the interlocking structure 514 can be formed before the matrix 518, or vice-versa.

The processes of blocks 504-508 can be implemented in various ways to produce the interlocking structure 514 and matrix 518 from the same material 510. For example, in some embodiments, the energy is selectively applied (e.g., via masking, scanning, patterning) to the material 510, such that certain regions of the material 510 are exposed to the energy while other regions are not exposed to the energy. For example, the first region 512 corresponding to the interlocking structure 514 can be exposed, while the second region 516 corresponding to the matrix 518 can remain unexposed, or vice-versa. The selective exposure can cause phase separation and/or diffusion of one or more polymerizable components. For example, the material 510 can be a polymerizable composition (e.g., a liquid resin) including a first polymerizable component (e.g., a first monomer) and a second polymerizable component (e.g., a second monomer) that are present in an initial ratio. After the energy is applied, the first polymerizable component can diffuse out of the exposed regions and into the unexposed regions, and/or the second polymerizable component can diffuse out of the unexposed regions and into the exposed regions. Accordingly, the exposed regions can include a first ratio of the first polymerizable component to the second polymerizable component, and the unexposed regions can include a second, different ratio of the first polymerizable component to the second polymerizable component. Additionally, the first and second ratios can each be different from the initial ratio. When the first and second polymerizable components are polymerized, the different ratios of these components in the exposed regions and unexposed regions can cause these regions to exhibit different properties, thus forming the interlocking structure 514 and the matrix 518. Additional details of this approach are provided in U.S. Pat. No. 10,495,973, the disclosure of which is incorporated by reference herein in its entirety.

As another example, the energy can be applied to both the first regions 512 and the second regions 516, but with differing energy application parameters such that the resulting interlocking structure 514 and matrixes 108 have different properties. For example, the energy applied to the first region 512 can differ from the energy applied to the second region 516 with respect to energy intensity, dosage, exposure time, wavelength, and/or energy type. The ability to vary the energy application parameters of the applied energy over different spatial locations (e.g., in x-, y-, and/or z-directions) in order to program the amount of residual curable material removed may be referred to herein as "grayscaling." In some embodiments, grayscaling affects the local characteristics of the first region 512 and second region 516, such as the degree of polymerization of the material 510, degree of curing of the material 510, double bond conversion of the material 510, crosslink density, phase, crystallinity, morphology, permeability, solubility, viscosity, swellability, reactivity, degradability, porosity, particle connectivity, surface area, and/or melting point. The local characteristics can directly affect the final properties of the interlocking structure 514 and the matrix 518, e.g., a region having a higher degree of polymerization can exhibit a higher modulus and/or $T_g$, while a region having a lower degree of polymerization can exhibit a lower modulus and/or $T_g$. Alternatively or in combination, the local characteristics can alter the amount of a residual material (e.g., a residual polymerizable component) that is removed from the first region 512 and/or second region 516 in a subsequent material removal process (e.g., solvent extraction), and the amount of residual material that is removed can affect the final properties of the interlocking structure 514 and the matrix 518. Additional details of this approach are provided in U.S. patent application Ser. No. 18/449,589, the disclosure of which is incorporated by reference in its entirety.

II. Additively Manufactured Objects with Mechanically Interlocking Elements

In some embodiments, the present technology provides additively manufactured objects that include a plurality of mechanically interlocked elements. For example, the additively manufactured objects can be dental appliances, such as aligners, palatal expanders, retainers, mouth guards, attachment placement devices, attachments, etc. The characteristics of the interlocked elements can be generally similar to the embodiments described above in Section I (e.g., the embodiments of FIGS. 2A-2M), except that the interlocking elements can have a feature size on a macroscopic size scale (e.g., same or similar to the size scale of a macroscopic additively manufactured object). For example, the interlocking elements can have a feature size within a range from 0.1 mm to 10 mm, 0.1 mm to 5 mm, 0.1 mm to 1 mm, 0.1 mm to 0.5 mm, 0.1 mm to 0.25 mm, 0.5 mm to 10 mm, 0.5 mm to 5 mm, 0.5 mm to 1 mm, 1 mm to 10 mm, 1 mm to 5 mm, or 5 mm to 10 mm. In some embodiments, the macroscopic object has a length, width, and/or height within a range from 1 cm to 50 cm, 1 cm to 20 cm, 1 cm to 10 cm, 1 cm to 5 cm, 5 cm to 10 cm, 5 cm to 25 cm, or 10 cm to 20 cm. The thickness of the macroscopic object can be within a range from 0.1 mm to 10 mm, 0.1 mm to 5 mm, 0.5 mm to 10 mm, 0.5 mm to 5 mm, or 5 mm to 10 mm.

As described above in Section I, interlocking elements can be mechanically coupled through each other in various ways, including, but not limited to, linkages, joints, complementary and/or mating interfaces, weaving, intertwining, entanglements, or suitable combinations thereof. In some embodiments, the interlocking elements directly contact each other when coupled and when the additively manufactured object is in a resting and/or unloaded state (e.g., when forces are not applied to the additively manufactured object). In other embodiments, the interlocking elements do not directly contact each other when coupled and when the additively manufactured object is in the resting and/or unloaded state. In such embodiments, the neighboring surfaces of the interlocking elements can be spaced apart from each other by a gap. The size of the gap (e.g., minimum, maximum, and/or average size) can be within a range from 0.1 mm to 10 mm, 0.1 mm to 5 mm, 0.1 mm to 1 mm, 0.1 mm to 0.5 mm, 0.1 mm to 0.25 mm, 0.5 mm to 10 mm, 0.5 mm to 5 mm, 0.5 mm to 1 mm, 1 mm to 10 mm, 1 mm to 5 mm, or 5 mm to 10 mm.

In some embodiments, the additively manufactured object includes a first object portion including a first interlocking element, and a second object portion including a second interlocking element. The first and second interlocking elements can be coupled to each other in order to connect the first object portion to the second object portion. However, the coupling between the first and second interlocking elements can be a releasable coupling, such that the first and second interlocking elements can be separated from each other without fracturing, plastically deforming, and/or otherwise damaging the first and/or second object portions. Accordingly, the first and second object portions can be temporarily coupled to each other via the first and second interlocking elements (e.g., during manufacturing, before use). When separation of the first and second object portions is desired (e.g., in preparation for use), the first and second object portions can be decoupled by disengaging the first and second interlocking elements from each other.

Figure 6A:
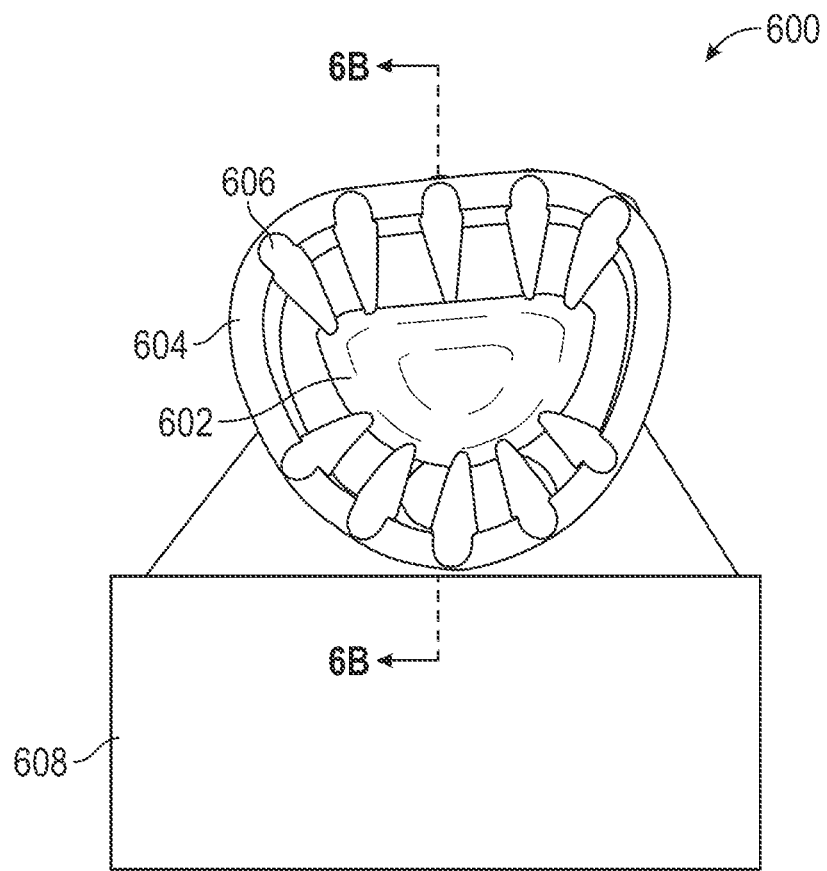
FIG. 6A is a front view of a portion of an attachment placement device configured in accordance with embodiments of the present technology.
Figure 6B:
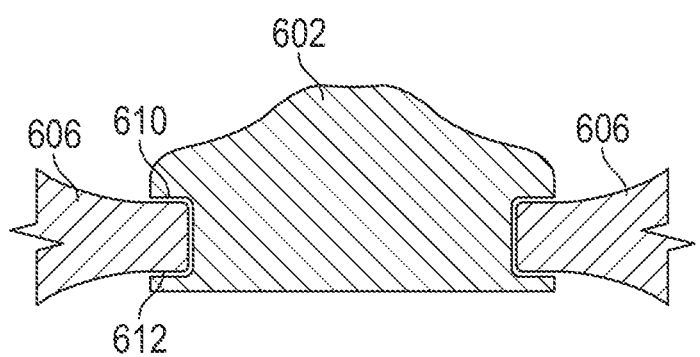
FIG. 6B is a side cross-sectional view of the device of FIG. 6A.

FIG. 6A is a front view of a portion of an attachment placement device ("device 600") configured in accordance with embodiments of the present technology, and FIG. 6B is a side cross-sectional view of the device 600. Referring first to FIG. 6A, the device 600 can be used to apply an attachment 602 to a patient's tooth. The attachment 602 can be configured to interact with a corresponding orthodontic appliance (e.g., an aligner) worn by the patient to impart one or more repositioning forces to the tooth. In some embodiments, the device 600 is used to facilitate accurate placement of the attachment 602 against a surface of the tooth, e.g., in a predetermined position and/or orientation according to an orthodontic treatment plan. Representative examples of attachment placement devices that can be used as the device 600 are described in U.S. Patent Application Publication Nos. 2021/0259809 and 2022/0183795, the disclosures of each of which are incorporated by reference herein in its entirety.

The attachment 602 can be coupled to a frame 604 via a plurality of supports 606, and the frame 604 can be connected to a base 608 (also known as a "registration portion," "registration element," or "registration anchor"). In some embodiments, the attachment 602 is prefabricated together with the frame 604, supports 606, and base 608, such that the attachment 602 is formed in situ within the frame 604 and coupled to the supports 606. The attachment 602, frame 604, supports 606, and base 608 in the same manufacturing process (e.g., a single additive manufacturing operation). Representative examples of methods for fabricating the device 600 are provided below.

The supports 606 can be a plurality of elongate members (e.g., struts, rods) that surround and couple to a perimeter of the attachment 602. The supports 606 can be configured to maintain the attachment 602 in position within the frame 604. In some embodiments, the attachment 602 and the supports 606 are discrete components (e.g., not bonded, fused, joined, or integrally formed with each other). The attachment 602 and supports 606 can be removably coupled to each other, so that the attachment 602 can be separated from the supports 606 without fracturing, plastically deforming, or otherwise damaging the attachment 602.

As best seen in FIG. 6B, the attachment 602 can include a plurality of first interlocking elements 610, and each support 606 can include a respective second interlocking element 612. The first interlocking elements 610 of the attachment 602 can couple to the second interlocking elements 612 of the supports 606 to interlock the attachment 602 to the supports 606. The first interlocking elements 610 and the second interlocking elements 612 can be configured in many different ways. For example, the first interlocking elements 610 and the second interlocking elements 612 can have complementary shapes. In the illustrated embodiment, the peripheral portion of the attachment 602 includes a plurality of recesses (e.g., grooves, apertures, holes, indentations), and each support 606 includes an end portion (e.g., protrusion, projection) that mates with and fits at least partially into a corresponding recess. Accordingly, the recesses can serve as the first interlocking elements 610 and the end portions can serve as the second interlocking elements 612. In other embodiments, the configuration can be reversed, e.g., the peripheral portion of the attachment 602 includes a plurality of protrusions that fit into corresponding recesses on the supports 606. Moreover, the first interlocking elements 610 and the second interlocking elements 612 can alternatively or additionally incorporate other types of complementary couplings, such as any of the embodiments described in connection with FIGS. 2E-2G.

In the illustrated embodiment, there is a gap between the complementary surfaces of the first interlocking elements 610 and each second interlocking element 612, such that the first interlocking elements 610 and each second interlocking element 612 do not contact each other when the device 600 is in an unloaded and/or resting configuration (e.g., when no force is being applied to the attachment 602 and supports 606). The gap size (e.g., maximum, minimum, or average gap size) can be 0.1 mm to 10 mm, 0.1 mm to 5 mm, 0.1 mm to 1 mm, 0.1 mm to 0.5 mm, 0.1 mm to 0.25 mm, 0.5 mm to 10 mm, 0.5 mm to 5 mm, 0.5 mm to 1 mm, 1 mm to 10 mm, 1 mm to 5 mm, or 5 mm to 10 mm. In other embodiments, however, the first interlocking elements 610 and second interlocking elements 612 can be in contact with each other even when the device 600 is in an unloaded and/or resting configuration.

In some embodiments, the supports 606 are sufficiently elastic and/or deformable such that the second interlocking elements 612 can be decoupled from the first interlocking elements 610 with little or no damage to the attachment 602. For example, when the supports 606 are pulled upward away from the attachment 602, the supports 606 can bend and/or deform such that the end portions slip out of the recesses in the attachment 602. Additionally, the supports 606 can be sufficiently elastic and/or deformable to avoid fracturing the supports 606 in a manner that leaves residual parts of the end portions in place within the recesses. In some embodiments, to facilitate separation of the attachment 602 and supports 606, the attachment 602 is made out of a material having a relatively high modulus and/or $T_g$, and the supports 606 are made out of a material having a relatively low modulus and/or $T_g$. Alternatively, the attachment 602 can be made out of the same material as the supports 606, but can be stiffer than the supports 606 due to geometry (e.g., the attachment 602 can be thicker than the supports 606), local characteristics of the material (e.g., the attachment 602 can be more highly cross-linked than the supports 606), and/or other suitable techniques.

The frame 604 can be configured to protect the attachment 602 and/or supports 606 from being detached and/or damaged before use (e.g., during manufacturing, handling, storage, and/or shipping). In the illustrated embodiment, the frame 604 is an annular structure that extends at least partially or completely around the perimeter of the attachment 602. The frame 604 can be connected to (e.g., integrally formed with) the supports 606.

The base 608 can be configured to mate with a corresponding portion of the patient's dentition (e.g., a surface of the tooth to which the attachment 602 will be mounted ("mounting surface")) to ensure that the attachment 602 is aligned with the mounting surface at the predetermined position and/or orientation. For example, the base 608 can include a contoured registration surface (not shown) to complement a surface of the tooth such that, when the registration surface of the base 608 is in complementary contact with the tooth surface, the attachment 602 is properly aligned with the mounting surface of the tooth. Once the attachment 602 is properly aligned, the attachment 602 can be coupled to the mounting surface of the tooth, e.g., using adhesives, bonding, direct curing in place, etc. The attachment 602 can then be separated from the supports 606 by disengaging the first interlocking elements 610 and second interlocking elements 612 from each other as described above, thus allowing the device 600 to be removed from the patient's mouth while the attachment 602 remains in place on the tooth.

Figure 7A:
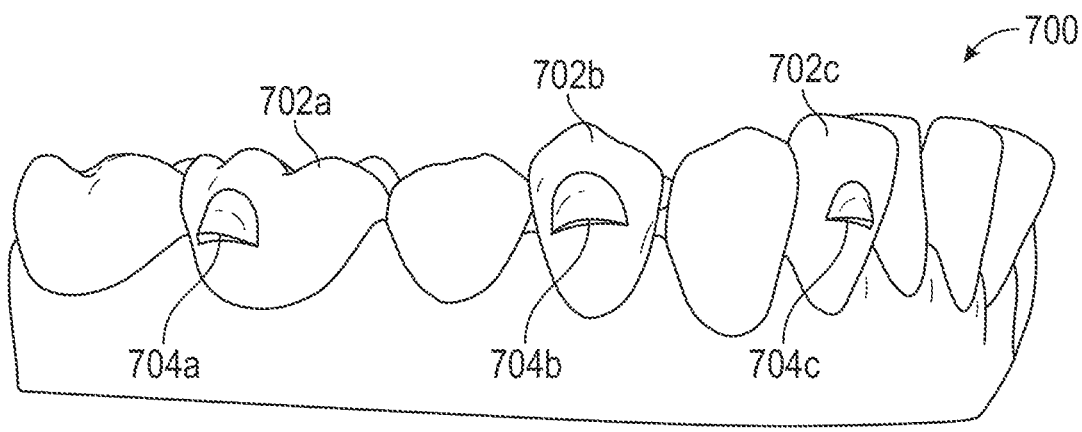
FIG. 7A is a perspective view of a patient's dentition with attachments, in accordance with embodiments of the present technology.

FIG. 7A is a perspective view of a patient's dentition 700, in accordance with embodiments of the present technology. The dentition 700 includes one or more teeth (e.g., a first tooth 702*a*, second tooth 702*b*, and third tooth 702*c*—collectively, "teeth 702") each having a respective attachment mounted thereon (e.g., a first attachment 704*a*, a second attachment 704*b*, and a third attachment 704*c*—collectively, "attachments 704"). As described above, the attachments 704 can be designed to engage with portions of an orthodontic appliance (e.g., an aligner or palatal expander) to apply forces to the teeth 702 in accordance with an orthodontic treatment plan. The attachments 704 can be placed at predetermined locations on the teeth 702 in order to apply appropriate forces (e.g., in magnitude and/or direction) in accordance with part of the treatment plan. In some embodiments, the treatment plan includes replacing some or all of the attachments 704 with one or more new attachments. For example, a subsequent set of attachments can have different shapes and/or be positioned at different locations on the teeth 702, and/or on different teeth, compared to the current set of attachments 704. As another example, one or more of the attachments 704 can be replaced with one or more new attachments having the same shape and configured to be positioned at the same locations on the teeth 702, e.g., if the original attachment 704 becomes damaged, falls off, or fails to adhere properly with the corresponding tooth 702.

Figure 7B:
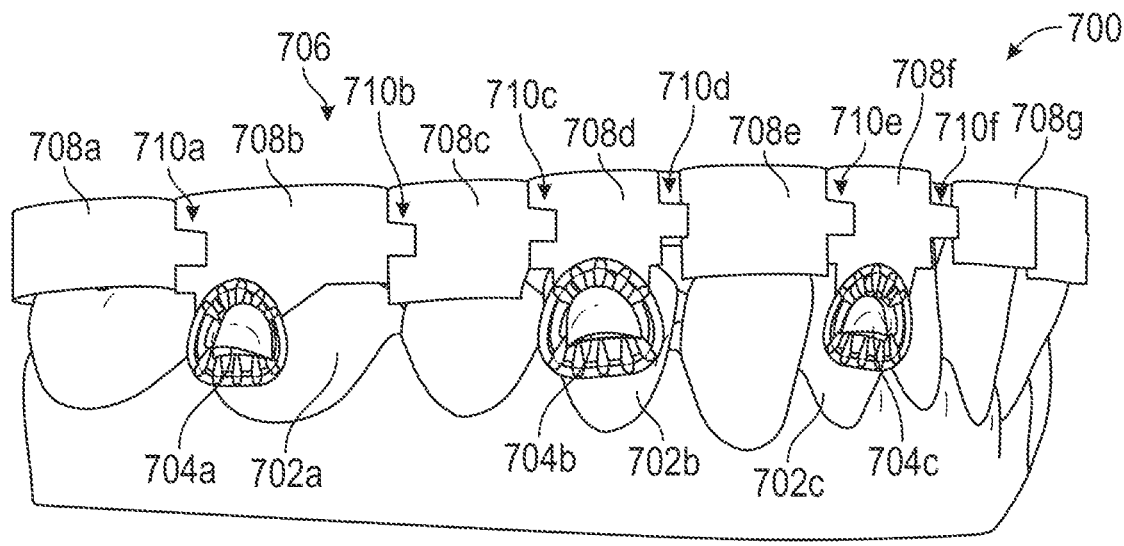
FIG. 7B is a perspective view of an attachment placement device on the dentition of FIG. 7A, in accordance with embodiments of the present technology.

FIG. 7B is a perspective view of an attachment placement device ("device 706") on the dentition 700, in accordance with embodiments of the present technology. The device 706 can be used to properly place the attachments 704 so that they can cooperate with the orthodontic appliance to apply the correct forces on the teeth 702. The device 706 can include a plurality of registration portions 708*a*-708*g* (collectively, "registration portions 708") that are configured to mate with surfaces of the patient's teeth. In some embodiments, some or all of the registration portions 708 include one or more cavities shaped to receive a corresponding one or more teeth to retain the device 706 in a specified spatial configuration with respect to the dentition 700. Some or all of the registration portions 708 can be coupled to a corresponding attachment 704 via a frame and supports, as previously described with respect to FIGS. 6A and 6B. The attachments 704 can be formed (e.g., prefabricated) with the registration portions 708 such that when the registration portions 708 are placed on the dentition 700, the attachments 704 are properly aligned with respect to the teeth 702 for bonding. For example, the attachments 704, registration portions 708, frames, and supports can be fabricated in the same manufacturing process (e.g., a single additive manufacturing operation), as described further below.

Some or all of the registration portions 708 can be removably connected to each other via interlocking couplings 710*a*-710*f* (collectively, "interlocking couplings 710"). For example, as shown in FIG. 7B, the first registration portion 708*a* can be coupled to the second registration portion 708*b* via a first interlocking coupling 710*a*; the second registration portion 708*b* can be coupled to the third registration portion 708*c* via a second interlocking coupling 710*b*; the third registration portion 708*c* can be coupled to the fourth registration portion 708*d* via a third interlocking coupling 710*c*; and so on. Optionally, only registration portions 708 that include an attachment 704 can have interlocking couplings 710 to neighboring registration portions 708.

Each interlocking coupling 710 can include a respective set of interlocking elements that couple to each other to interlock the corresponding pair of registration portions 708 to each other. The interlocking elements can be configured in many different ways. For example, the interlocking elements can have complementary shapes. In the illustrated embodiment, each interlocking coupling includes a first interlocking element defining a recess, and a second interlocking element including a protrusion that mates with and fits at least partially into the recess. Alternatively or in combination, some or all of the interlocking couplings can alternatively or additionally incorporate other types of complementary couplings, such as any of the embodiments described in connection with FIGS. 2E-2G.

In the illustrated embodiment, the interlocking elements are in direct contact with each other, such that is little or no space between the complementary surfaces of the interlocking couplings. In other embodiments, there can be a gap between the complementary surfaces of the interlocking elements, such that the interlocking elements do not contact each other when the device 706 is in an unloaded and/or resting configuration. The gap size (e.g., maximum, minimum, or average gap size) can be 0.1 mm to 10 mm, 0.1 mm to 5 mm, 0.1 mm to 1 mm, 0.1 mm to 0.5 mm, 0.1 mm to 0.25 mm, 0.5 mm to 10 mm, 0.5 mm to 5 mm, 0.5 mm to 1 mm, 1 mm to 10 mm, 1 mm to 5 mm, or 5 mm to 10 mm.

In some embodiments, the material of the registration portions 708 at or near the interlocking couplings 710 is sufficiently elastic and/or deformable such that the interlocking elements can be detached from each other with little or no damage to the registration portions 708. For example, when the registration portion 708*b* is pulled away from the neighboring registration portions 708*a*, 708*c*, the interlocking elements of the interlocking couplings 710a, 710b can bend and/or deform such that the protrusions slip out of the recesses.

This approach can be used to selectively decouple selected registration portions 708 before applying the device 706 to the dentition 700. For example, in embodiments where the device 706 is being used to replace only selected attachments 704 (e.g., the first attachment 704a and second attachment 704b) but not other attachments 704 (e.g., the third attachment 704c), the registration portion 708 connected to the attachment 704 that is not being replaced (e.g., registration portion 708f) can be disconnected from the rest of the device 706. The remaining registration portions 708 (e.g., registration portions 708a-708e and 708g) can then be placed on the dentition 700 to align the new attachments 704 to their corresponding teeth 702. Accordingly, a single design for the device 706 can be reused even if not all of the attachments 704 will be applied to the teeth 702. Optionally, the interlocking configuration of the device 706 can be used to customize the device 706 to a particular patient and/or particular treatment stage, e.g., the registration portions 708 can be independently exchanged with other registration portions 708 depending on the desired arrangement of attachments 704 on the dentition 700 for the particular patient and/or treatment stage.

Although the above description of FIGS. 6A-7B relate to attachment placement devices with interlocking elements, this is not intended to be limiting, and the present technology can be applied to other types of dental appliances (e.g., aligners, palatal expanders, retainers, mouth guards, attachments). For example, the techniques described herein can be used to fabricate a dental appliance with interlocking, removable supports (e.g., struts, cones, posts) that connect the appliance to a build platform during an additive manufacturing process. In such embodiments, the appliance can be detachably coupled to the supports via respective interlocking elements, such as any suitable embodiment described herein (e.g., the embodiments of FIGS. 2E-2I and 6A-7B). Subsequently, the appliance can be separated from the supports by disengaging the interlocking elements, rather than by fracturing the supports. This approach can decrease the likelihood of damage to the appliance, as well as reduce or eliminate the need to polish the appliance to remove residual support fragments. Additional examples and features of dental appliances that may be used with the present technology are provided in Section III below.

Figure 8:
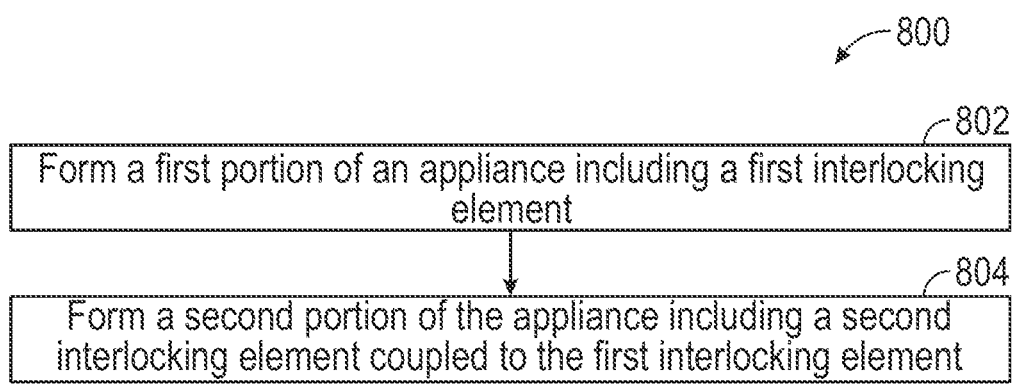
FIG. 8 is a flow diagram illustrating a method of fabricating a dental appliance, in accordance with embodiments of the present technology.

FIG. 8 is a flow diagram illustrating a method 800 of fabricating a dental appliance, in accordance with embodiments of the present technology. The method 800 can be used to fabricate any embodiment of the dental appliances described herein. In some embodiments, some or all of the processes of the method 800 are implemented as computer-readable instructions (e.g., program code) that are configured to be executed by one or more processors of a computing device (e.g., a controller of a manufacturing system). The method 800 can be combined with any of the other methods described herein.

The method 800 begins at block 802 with forming a first portion of an appliance (e.g., aligner, palatal expander, retainer, mouth guard, attachment placement device, attachment) including a first interlocking element. At block 804, the method 800 can continue with forming a second portion of the appliance including a second interlocking element coupled to the first interlocking element. For example, the first portion can be a temporary component (e.g., the supports 606 of the device 600 of FIGS. 6A and 6B, a 3D printing support), and the second portion can be a functional component (e.g., the attachment 602 of FIGS. 6A and 6B, a portion of an appliance shell). As another example, the first portion and second portions can be components that are intended to be removably coupled to each other (e.g., the registration portions 708 of the device 706 of FIG. 7B). The first and second interlocking elements can be any of the embodiments described herein.

In some embodiments, the first and second interlocking elements are fabricated in situ in the interlocked configuration in a single fabrication process or operation, such that no additional process steps are needed to couple the first and second interlocking elements to each other. For example, the first and second interlocking elements can be concurrently fabricated using an additive manufacturing process, such as any of the processes described elsewhere herein (e.g., DLP, SLA, FDM, VAM (e.g., holography), inkjet, a two-photon technique). In some embodiments, the additive manufacturing process utilizes a technique capable of printing floating islands, such as VAM and/or powder bed fusion. Accordingly, the first and second interlocking elements can be fabricated such that any gaps between the elements are already present in the printed product. Alternatively or in combination, the additive manufacturing process can utilize a technique capable of printing multiple materials (e.g., material jetting processes, powder binding processes, multi-nozzle FDM processes, hybrid processes). In such embodiments, the first and second interlocking elements can be printed from a first material, and the gaps between the elements can be partially or completely filled with a second material. The second material can be a sacrificial material that is removed in subsequent processing (e.g., via solvent extraction, melting, vacuum, washing) to create the gaps.

III. Dental Appliances and Associated Methods

Figure 9A:
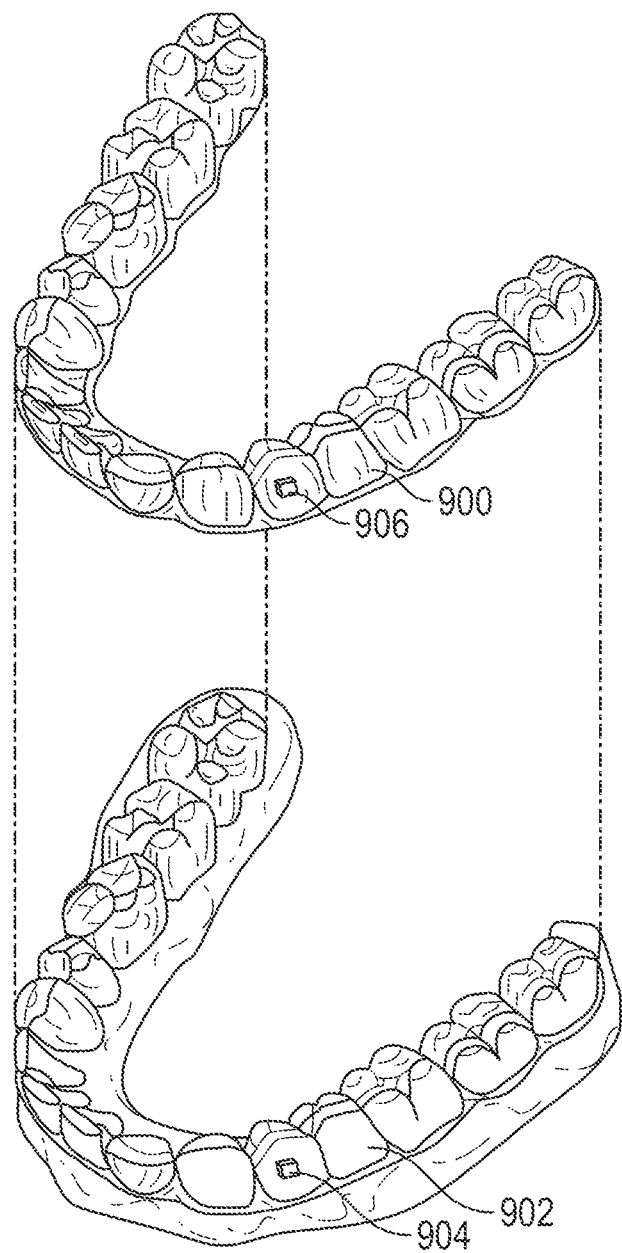
FIG. 9A illustrates a representative example of a tooth repositioning appliance configured in accordance with embodiments of the present technology.

FIG. 9A illustrates a representative example of a tooth repositioning appliance 900 configured in accordance with embodiments of the present technology. The appliance 900 can be fabricated using any of the materials and methods described herein. The appliance 900 (also referred to herein as an "aligner") can be worn by a patient in order to achieve an incremental repositioning of individual teeth 902 in the jaw. The appliance 900 can include a shell (e.g., a continuous polymeric shell or a segmented shell) having teeth-receiving cavities that receive and resiliently reposition the teeth. The appliance 900 or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated, e.g., using additive manufacturing techniques, from a digital model of an appliance.

The appliance 900 can fit over all teeth present in an upper or lower jaw, or less than all of the teeth. The appliance 900 can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance 900 can be a generic appliance configured to receive the teeth, but not necessarily shaped to match the topography of the patient's teeth. In some cases, only certain teeth received by the appliance 900 are repositioned by the appliance 900 while other teeth can provide a base or anchor region for holding the appliance 900 in place as it applies force against the tooth or teeth targeted for repositioning. In some cases, some, most, or even all of the teeth can be repositioned at some point during treatment. Teeth that are moved can also serve as a base or anchor for holding the appliance as it is worn by the patient. In preferred embodiments, no wires or other means are provided for holding the appliance 900 in place over the teeth. In some cases, however, it may be desirable or necessary to provide individual attachments 904 or other anchoring elements on teeth 902 with corresponding receptacles 906 or apertures in the appliance 900 so that the appliance 900 can apply a selected force on the tooth. Representative examples of appliances, including those utilized in the Invisalign® System, are described in numerous patents and patent applications assigned to Align Technology, Inc. including, for example, in U.S. Pat. Nos. 6,450, 807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 9B:
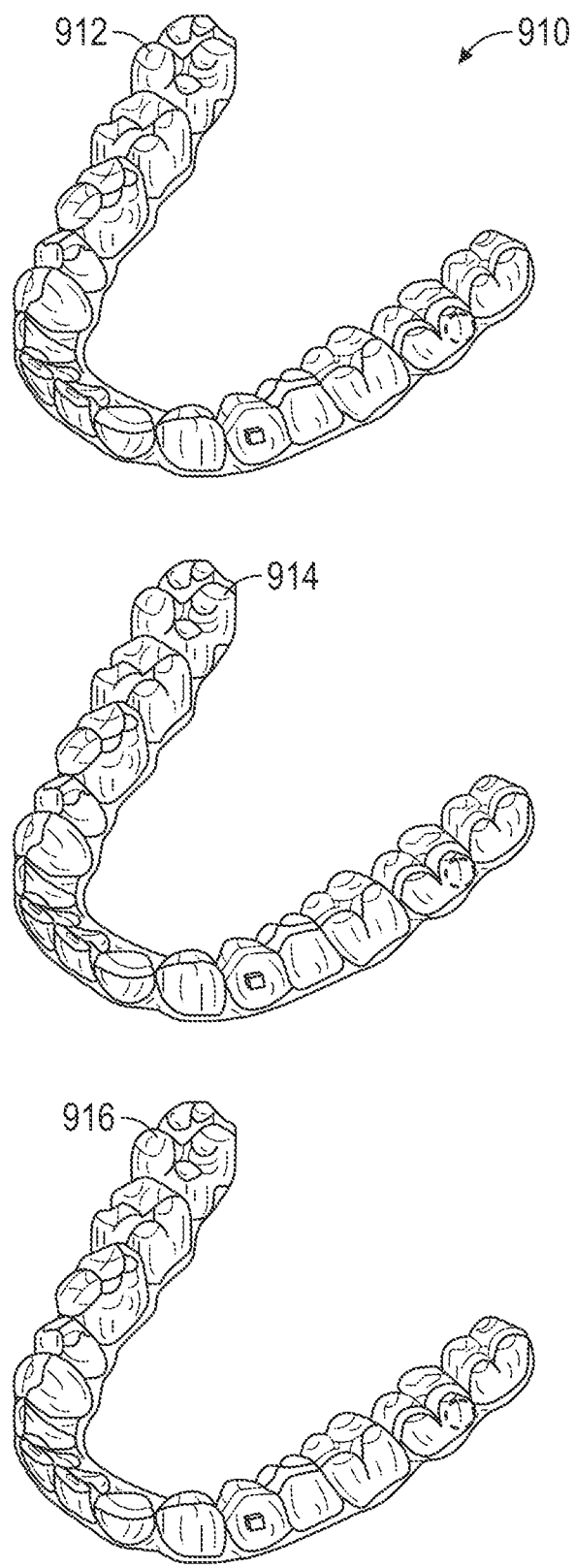
FIG. 9B illustrates a tooth repositioning system including a plurality of appliances, in accordance with embodiments of the present technology.

FIG. 9B illustrates a tooth repositioning system 910 including a plurality of appliances 912, 914, 916, in accordance with embodiments of the present technology. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 910 can include a first appliance 912 corresponding to an initial tooth arrangement, one or more intermediate appliances 914 corresponding to one or more intermediate arrangements, and a final appliance 916 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

Figure 9C:
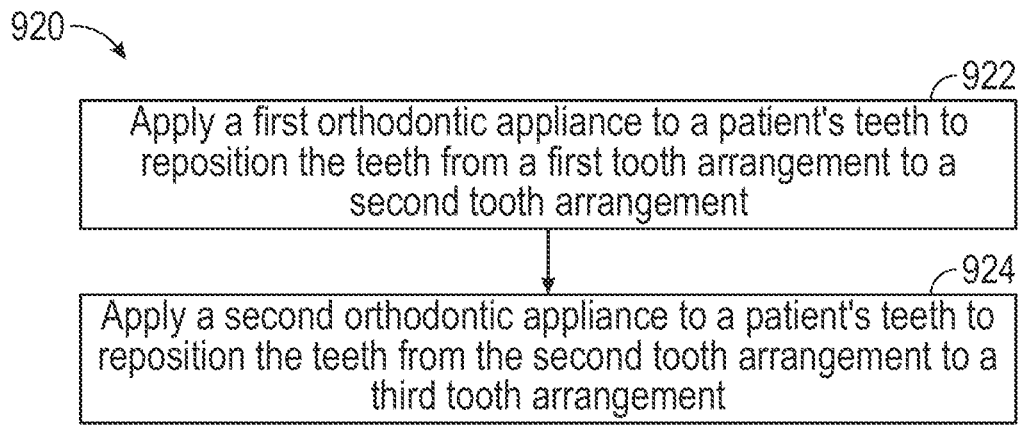
FIG. 9C illustrates a method of orthodontic treatment using a plurality of appliances, in accordance with embodiments of the present technology.

FIG. 9C illustrates a method 920 of orthodontic treatment using a plurality of appliances, in accordance with embodiments of the present technology. The method 920 can be practiced using any of the appliances or appliance sets described herein. In block 922, a first orthodontic appliance is applied to a patient's teeth in order to reposition the teeth from a first tooth arrangement to a second tooth arrangement. In block 924, a second orthodontic appliance is applied to the patient's teeth in order to reposition the teeth from the second tooth arrangement to a third tooth arrangement. The method 920 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

Figure 10:
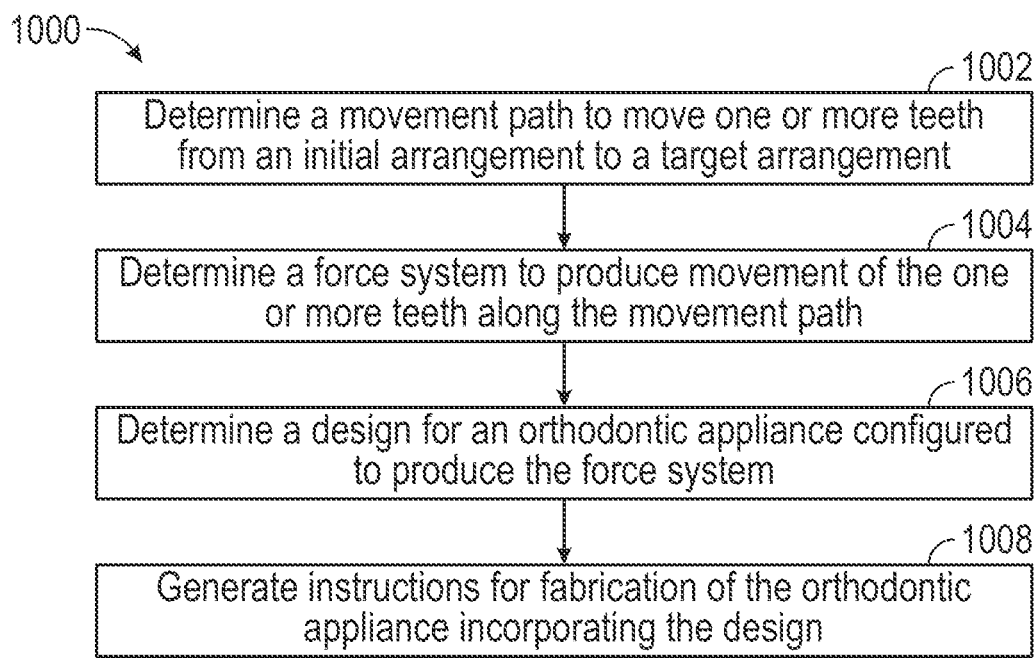
FIG. 10 illustrates a method for designing an orthodontic appliance, in accordance with embodiments of the present technology.

FIG. 10 illustrates a method 1000 for designing an orthodontic appliance, in accordance with embodiments of the present technology. The method 1000 can be applied to any embodiment of the orthodontic appliances described herein. Some or all of the steps of the method 1000 can be performed by any suitable data processing system or device, e.g., one or more processors configured with suitable instructions.

In block 1002, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In block 1004, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

Determination of the force system can be performed in a variety of ways. For example, in some embodiments, the force system is determined on a patient-by-patient basis, e.g., using patient-specific data. Alternatively or in combination, the force system can be determined based on a generalized model of tooth movement (e.g., based on experimentation, modeling, clinical data, etc.), such that patient-specific data is not necessarily used. In some embodiments, determination of a force system involves calculating specific force values to be applied to one or more teeth to produce a particular movement. Alternatively, determination of a force system can be performed at a high level without calculating specific force values for the teeth. For instance, block 1004 can involve determining a particular type of force to be applied (e.g., extrusive force, intrusive force, translational force, rotational force, tipping force, torquing force, etc.) without calculating the specific magnitude and/or direction of the force.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as X-ray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients can require lower forces to expand the suture than older patients, as the suture has not yet fully formed.

In block 1006, a design for an orthodontic appliance configured to produce the force system is determined. The design can include the appliance geometry, material composition and/or material properties, and can be determined in various ways, such as using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the Auto-CAD® software products available from Autodesk, Inc., of San Rafael, CA. For creating finite element models and analyzing them, program products from a number of vendors can be used, including finite element analysis packages from ANSYS, Inc., of Canonsburg, PA, and SIMULIA (Abaqus) software products from Dassault Systemes of Waltham, MA.

Optionally, one or more designs can be selected for testing or force modeling. As noted above, a desired tooth movement, as well as a force system required or desired for eliciting the desired tooth movement, can be identified. Using the simulation environment, a candidate design can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In block 1008, instructions for fabrication of the orthodontic appliance incorporating the design are generated. The instructions can be configured to control a fabrication system or device in order to produce the orthodontic appliance with the specified design. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming.

Although the above steps show a method 1000 of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method 1000 may be performed with any suitable fabrication system or device, such as the embodiments described herein. Some of the steps may be optional, e.g., the process of block 1004 can be omitted, such that the orthodontic appliance is designed based on the desired teeth movements and/or determined tooth movement path, rather than based on a force system. Moreover, the order of the steps can be varied as desired.

Figure 11:
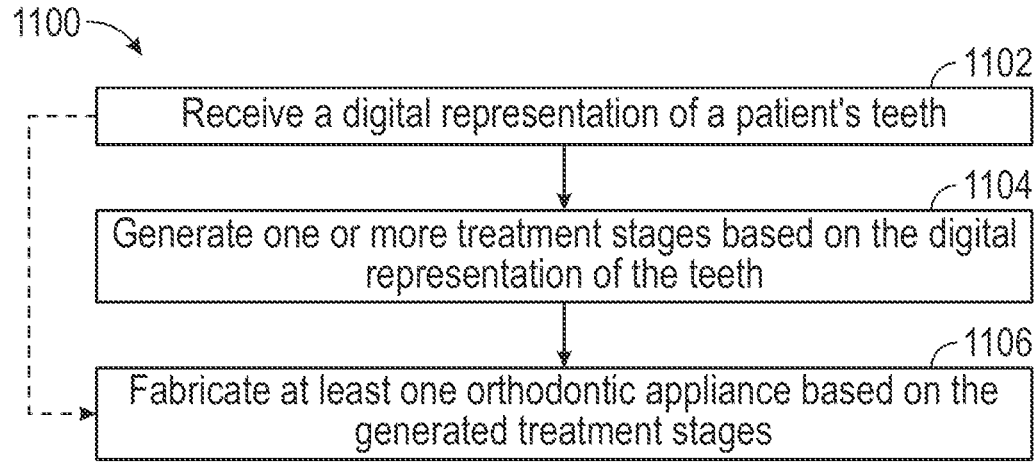
FIG. 11 illustrates a method for digitally planning an orthodontic treatment and/or design or fabrication of an appliance, in accordance with embodiments of the present technology.

FIG. 11 illustrates a method 1100 for digitally planning an orthodontic treatment and/or design or fabrication of an appliance, in accordance with embodiments. The method 1100 can be applied to any of the treatment procedures described herein and can be performed by any suitable data processing system.

In block 1102 a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In block 1104, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In block 1106, at least one orthodontic appliance is fabricated based on the generated treatment stages. For example, a set of appliances can be fabricated, each shaped according to a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 11, design and/or fabrication of an orthodontic appliance, and perhaps a particular orthodontic treatment, may include use of a representation of the patient's teeth (e.g., including receiving a digital representation of the patient's teeth (block 1102)), followed by design and/or fabrication of an orthodontic appliance based on a representation of the patient's teeth in the arrangement represented by the received representation.

As noted herein, the techniques described herein can be used for the direct fabrication of dental appliances, such as aligners and/or a series of aligners with tooth-receiving cavities configured to move a person's teeth from an initial arrangement toward a target arrangement in accordance with a treatment plan. Aligners can include mandibular repositioning elements, such as those described in U.S. Pat. No. 10,912,629, entitled "Dental Appliances with Repositioning Jaw Elements," filed Nov. 30, 2015; U.S. Pat. No. 10,537,406, entitled "Dental Appliances with Repositioning Jaw Elements," filed Sep. 19, 2014; and U.S. Pat. No. 9,844,424, entitled "Dental Appliances with Repositioning Jaw Elements," filed Feb. 21, 2014; all of which are incorporated by reference herein in their entirety.

The techniques used herein can also be used to manufacture attachment placement devices, e.g., appliances used to position pre-fabricated attachments on a person's teeth in accordance with one or more aspects of a treatment plan. Examples of attachment placement devices (also known as "attachment placement templates" or "attachment fabrication templates") can be found at least in: U.S. application Ser. No. 17/249,218, entitled "Flexible 3D Printed Orthodontic Device," filed Feb. 24, 2021; U.S. application Ser. No. 16/366,686, entitled "Dental Attachment Placement Structure," filed Mar. 27, 2019; U.S. application Ser. No. 15/674,662, entitled "Devices and Systems for Creation of Attachments," filed Aug. 11, 2017; U.S. Pat. No. 11,103,330, entitled "Dental Attachment Placement Structure," filed Jun. 14, 2017; U.S. application Ser. No. 14/963,527, entitled "Dental Attachment Placement Structure," filed Dec. 9, 2015; U.S. application Ser. No. 14/939,246, entitled "Dental Attachment Placement Structure," filed Nov. 12, 2015; U.S. application Ser. No. 14/939,252, entitled "Dental Attachment Formation Structures," filed Nov. 12, 2015; and U.S. Pat. No. 9,700,385, entitled "Attachment Structure," filed Aug. 22, 2014; all of which are incorporated by reference herein in their entirety.

The techniques described herein can be used to make incremental palatal expanders and/or a series of incremental palatal expanders used to expand a person's palate from an initial position toward a target position in accordance with one or more aspects of a treatment plan. Examples of incremental palatal expanders can be found at least in: U.S. application Ser. No. 16/380,801, entitled "Releasable Palatal Expanders," filed Apr. 10, 2019; U.S. application Ser. No. 16/022,552, entitled "Devices, Systems, and Methods for Dental Arch Expansion," filed Jun. 28, 2018; U.S. Pat. No. 11,045,283, entitled "Palatal Expander with Skeletal Anchorage Devices," filed Jun. 8, 2018; U.S. application Ser. No. 15/831,159, entitled "Palatal Expanders and Methods of Expanding a Palate," filed Dec. 4, 2017; U.S. Pat. No. 10,993,783, entitled "Methods and Apparatuses for Customizing a Rapid Palatal Expander," filed Dec. 4, 2017; and U.S. Pat. No. 7,192,273, entitled "System and Method for Palatal Expansion," filed Aug. 7, 2003; all of which are incorporated by reference herein in their entirety.

Examples

The following examples are included to further describe some aspects of the present technology, and should not be used to limit the scope of the technology.

Example 1. A dental appliance comprising:
an appliance body made at least partially out of a composite material, wherein the composite material comprises:
an interlocking structure comprising a plurality of interlocking elements, wherein the interlocking structure has a first mechanical property; and
a matrix surrounding at least a portion of the interlocking structure, wherein the matrix has a second mechanical property different from the first mechanical property.

Example 2. The dental appliance of Example 1, wherein the interlocking structure comprises:
a first portion comprising a first interlocking element, and
a second portion comprising a second interlocking element coupled to the first interlocking element.

Example 3. The dental appliance of Example 2, wherein:
the composite material has a first stiffness along a first direction, and a second, lower stiffness along a second direction, and
movement of the first and second interlocking elements along the second direction is less constrained than movement of the first and second interlocking elements along the first direction.

Example 4. The dental appliance of Example 3, wherein the first direction comprises a translational direction, and the second direction comprises a rotational direction.

Example 5. The dental appliance of any one of Examples 2 to 4, wherein the first interlocking element comprises an annular member.

Example 6. The dental appliance of Example 5, wherein the second interlocking element passes through the annular member.

Example 7. The dental appliance of Example 5 or 6, wherein the second interlocking element comprises a second annular member interlinked with the annular member.

Example 8. The dental appliance of any one of Examples 5 to 7, wherein the second interlocking element comprises an elongate member passing through the annular member.

Example 9. The dental appliance of any one of Examples 2 to 8, wherein the first interlocking element and the second interlocking element comprise complementary shapes.

Example 10. The dental appliance of any one of Examples 2 to 9, wherein the first interlocking element comprises a first projection configured to fit into a recess of the second portion, and the second interlocking element comprises a second projection configured to fit into a recess of the first portion.

Example 11. The dental appliance of any one of Examples 2 to 10, wherein the first interlocking element is intertwined or entangled with the second interlocking element.

Example 12. The dental appliance of any one of Examples 2 to 11, wherein, when the composite material is in an unloaded configuration, the first and second interlocking elements are spaced apart from each other.

Example 13. The dental appliance of any one of Examples 2 to 11, wherein, when the composite material is in an unloaded configuration, the first and second interlocking elements are in direct contact with each other.

Example 14. The dental appliance of any one of Examples 1 to 13, wherein the first and second mechanical properties each comprise one or more of the following: stiffness, modulus, elongation to break, elongation to yield, strength, brittleness, or hardness.

Example 15. The dental appliance of any one of Examples 1 to 14, wherein the interlocking structure comprises a first material, and the matrix comprises a second material different from the first material.

Example 16. The dental appliance of Example 15, wherein the first material has a first modulus, and the second material has a second modulus different from the first modulus.

Example 17. The dental appliance of Example 16, wherein the second modulus is less than the first modulus.

Example 18. The dental appliance of any one of Examples 1 to 14, wherein the interlocking structure and the matrix comprise the same material.

Example 19. The dental appliance of Example 18, wherein the interlocking structure comprises a different degree of crosslinking than the matrix.

Example 20. The dental appliance of Example 18 or 19, wherein the interlocking structure comprises a different amount of a removable component than the matrix.

Example 21. The dental appliance of any one of Examples 18 to 20, wherein:
the material comprises a first polymerizable component and a second polymerizable component,
the interlocking structure comprises a first ratio of the first polymerizable component to the second polymerizable component, and
the matrix comprises a second ratio of the first polymerizable component to the second polymerizable component, the second ratio being different from the first ratio.

Example 22. The dental appliance of any one of Examples 1 to 21, wherein each of the plurality of interlocking elements has a feature size less than or equal to 500 μm.

Example 23. The dental appliance of any one of Examples 1 to 22, wherein the dental appliance is an aligner, a palatal expander, a retainer, a mouth guard, an attachment placement device, or an attachment.

Example 24. The dental appliance of any one of Examples 1 to 23, wherein the appliance body comprises a shell having a plurality of teeth-receiving cavities.

Example 25. The dental appliance of Example 24, wherein the teeth-receiving cavities are configured to reposition a patient's teeth from a first arrangement toward a second arrangement.

Example 26. A method comprising:
forming a dental appliance at least partially out of a composite material, wherein the composite material comprises:
an interlocking structure comprising a plurality of interlocking elements, wherein the interlocking structure has a first mechanical property; and
a matrix surrounding at least a portion of the interlocking structure, wherein the matrix has a second mechanical property different from the first mechanical property.

Example 27. The method of Example 26, wherein forming the dental appliance comprises:
forming the interlocking structure from a first material, and
forming the matrix from a second material different from the first material.

Example 28. The method of Example 27, wherein the interlocking structure is formed separately from the matrix.

Example 29. The method of Example 27 or 28, further comprising surrounding at least a portion of the interlocking structure with the matrix.

Example 30. The method of any one of Examples 27 to 29, further comprising coupling the matrix to the interlocking structure.

Example 31. The method of any one of Examples 27 to 30, wherein the interlocking structure and the matrix are formed concurrently.

Example 32. The method of Example 31, wherein the interlocking structure and the matrix are formed in the same additive manufacturing process.

Example 33. The method of Example 32, wherein the additive manufacturing process comprises:
- forming a first portion of the dental appliance including a first section of the interlocking structure and a first section of the matrix, and
- forming a second portion of the dental appliance including a second section of the interlocking structure and a second section of the matrix.

Example 34. The method of any one of Examples 27 to 33, wherein forming the dental appliance comprises forming the interlocking structure and the matrix from the same material.

Example 35. The method of Example 34, wherein forming the dental appliance comprises:
- providing the material, wherein the material comprises an initial ratio of a first polymerizable component to a second polymerizable component,
- applying energy to the material,
- forming the interlocking structure, wherein the interlocking structure comprises a first ratio of the first polymerizable component to the second polymerizable component, the first ratio being different from the initial ratio, and
- forming the matrix, wherein the matrix comprises a second ratio of the first polymerizable component to the second polymerizable component, the second ratio being different from the initial ratio and the first ratio.

Example 36. The method of Example 34 or 35, wherein forming the dental appliance comprises:
- applying energy to a first region of the material using a first set of energy application parameters,
- applying the energy to a second region of the material using a second set of energy application parameters different from the first set of energy application parameters,
- forming the interlocking structure from the first region, and
- forming the matrix from the second region.

Example 37. The method of Example 36, wherein forming the dental appliance comprises removing residual material from the first and second regions, wherein a different amount of residual material is removed from the first and second regions.

Example 38. The method of any one of Examples 27 to 37, wherein the dental appliance is an aligner, a palatal expander, a retainer, a mouth guard, an attachment placement device, or an attachment.

Example 39. The method of any one of Examples 27 to 38, wherein the dental appliance comprises a shell having a plurality of teeth-receiving cavities.

Example 40. The method of Example 39, wherein the teeth-receiving cavities are configured to reposition a patient's teeth from a first arrangement toward a second arrangement.

Example 41. A dental appliance comprising:
- an attachment configured to be mounted on a patient's tooth, wherein the attachment includes a plurality of first interlocking elements;
- a plurality of supports coupled to the attachment, each support including a second interlocking element removably coupled to a corresponding first interlocking element;
- a frame surrounding at least a portion of the attachment and coupled to the plurality of supports; and
- a registration portion coupled to the frame.

Example 42. The dental appliance of Example 41, wherein each first interlocking element comprises a shape that is complementary to a shape of the corresponding second interlocking element.

Example 43. The dental appliance of Example 41 or 42, wherein each first interlocking element comprises a recess, and each second interlocking element comprises a protrusion that fits at least partially into the recess.

Example 44. The dental appliance of any one of Examples 41 to 43, wherein each first interlocking element can be decoupled from the corresponding second interlocking element without fracturing the corresponding support.

Example 45. The dental appliance of any one of Examples 41 to 44, wherein, when the appliance is in an unloaded configuration, each first interlocking element is spaced apart from the corresponding second interlocking element by a gap.

Example 46. The dental appliance of Example 45, wherein the gap is within a range from 0.1 mm to 1 mm.

Example 47. The dental appliance of any one of Examples 41 to 44, wherein, when the appliance is in an unloaded configuration, each first interlocking element contacts at least a portion of the corresponding second interlocking element.

Example 48. The dental appliance of any one of Examples 41 to 47, wherein the attachment is stiffer than the plurality of supports.

Example 49. The dental appliance of any one of Examples 41 to 48, wherein the registration portion includes a surface configured to engage and mate with a surface of the patient's tooth.

Example 50. The dental appliance of Example 49, wherein, when the surface is engaged with the surface of the patient's tooth, the attachment is positioned at a predetermined location on the patient's tooth.

Example 51. The dental appliance of any one of Examples 41 to 50, wherein the dental appliance is an attachment placement device.

Example 52. A method comprising:
- placing a registration portion of an appliance onto a patient's tooth, wherein:
  - the registration portion is coupled to an attachment via a plurality of supports,
  - the attachment includes a plurality of first interlocking elements, and
  - each support includes a second interlocking element coupled to a corresponding first interlocking element;
- coupling the attachment to the patient's tooth; and
- decoupling the attachment from the plurality of supports by disengaging each first interlocking element from a corresponding second interlocking element.

Example 53. The method of Example 52, wherein decoupling the attachment from the plurality of supports occurs without fracturing any of the plurality of supports.

Example 54. The method of Example 52 or 53, wherein each first interlocking element comprises a shape that is complementary to a shape of the corresponding second interlocking element.

Example 55. The method of any one of Examples 52 to 54, wherein each first interlocking element comprises a recess, and each second interlocking element comprises a protrusion that fits at least partially into the recess.

Example 56. The method of any one of Examples 52 to 55, wherein, when the appliance is in an unloaded configuration, each first interlocking element is spaced apart from the corresponding second interlocking element by a gap.

Example 57. The method of any one of Examples 52 to 56, wherein, when the appliance is in an unloaded configuration, each first interlocking element contacts at least a portion of a corresponding second interlocking element.

Example 58. The method of any one of Examples 52 to 57, further comprising engaging a surface of the patient's tooth with the registration portion.

Example 59. The method of Example 58, wherein the engagement causes the attachment to be aligned to a predetermined location on the patient's tooth.

Example 60. The method of any one of Examples 52 to 59, wherein the registration portion, attachment, and plurality of supports are fabricated concurrently in a single additive manufacturing process.

Example 61. The method of Example 60, wherein each first interlocking element is fabricated in situ in an interlocked configuration with a corresponding second interlocking element.

Example 62. The method of Example 69 or 61, wherein the single additive manufacturing process comprises a volumetric additive manufacturing process.

Example 63. A method comprising:
fabricating a first portion of an appliance including a first interlocking element via an additive manufacturing process; and
fabricating a second portion of the appliance including a second interlocking element via the additive manufacturing process, wherein the second interlocking element is fabricated in situ in an interlocking configuration with the first interlocking element.

Example 64. The method of Example 63, wherein the first portion comprises a temporary component of the appliance, and the second portion comprises a functional component of the appliance.

Example 65. The method of Example 64, wherein the temporary component comprises a support.

Example 66. The method of Example 64 or 65, wherein the functional component comprises an attachment.

Example 67. The method of Example 64 or 65, wherein the appliance is an aligner, and the functional component comprises a portion of a shell comprising a plurality of teeth receiving cavities.

Example 68. The method of any one of Examples 63 to 67, wherein the first and second portions are configured to be removably coupled to each other via the first and second interlocking elements.

Example 69. The method of Example 68, wherein the first and second portions are configured to be decoupled from each other without fracturing one or more of the first or second portions.

Example 70. The method of any one of Examples 63 to 69, wherein the first interlocking element comprises a shape that is complementary to a shape of the second interlocking element.

Example 71. The method of any one of Examples 63 to 70, wherein the first interlocking element comprises a recess, and the second interlocking element comprises a protrusion that fits at least partially into the recess.

Example 72. The method of any one of Examples 63 to 71, wherein, when the appliance is in an unloaded configuration, the first interlocking element is spaced apart from the second interlocking element by a gap.

Example 73. The method of any one of Examples 63 to 71, wherein, when the appliance is in an unloaded configuration, the first interlocking element contacts at least a portion of the second interlocking element.

Example 74. The method of any one of Examples 63 to 73, wherein the additive manufacturing process comprises a volumetric additive manufacturing process.

CONCLUSION

Although many of the embodiments are described above with respect to systems, devices, and methods in connection with dental appliances, the technology is applicable to other applications and/or other approaches, such as other types of objects. Moreover, other embodiments in addition to those described herein are within the scope of the technology. Additionally, several other embodiments of the technology can have different configurations, components, or procedures than those described herein. A person of ordinary skill in the art, therefore, will accordingly understand that the technology can have other embodiments with additional elements, or the technology can have other embodiments without several of the features shown and described above with reference to FIGS. 1A-11.

The various processes described herein can be partially or fully implemented using program code including instructions executable by one or more processors of a computing system for implementing specific logical functions or steps in the process. The program code can be stored on any type of computer-readable medium, such as a storage device including a disk or hard drive. Computer-readable media containing code, or portions of code, can include any appropriate media known in the art, such as non-transitory computer-readable storage media. Computer-readable media can include volatile and non-volatile, removable and non-removable media implemented in any method or technology for storage and/or transmission of information, including, but not limited to, random-access memory (RAM), read-only memory (ROM), electrically erasable programmable read-only memory (EEPROM), flash memory, or other memory technology; compact disc read-only memory (CD-ROM), digital video disc (DVD), or other optical storage; magnetic cassettes, magnetic tape, magnetic disk storage, or other magnetic storage devices; solid state drives (SSD) or other solid state storage devices; or any other medium which can be used to store the desired information and which can be accessed by a system device.

The descriptions of embodiments of the technology are not intended to be exhaustive or to limit the technology to the precise form disclosed above. Where the context permits, singular or plural terms may also include the plural or singular term, respectively. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. The various embodiments described herein may also be combined to provide further embodiments.

As used herein, the terms "generally," "substantially," "about," and similar terms are used as terms of approximation and not as terms of degree, and are intended to account for the inherent variations in measured or calculated values that would be recognized by those of ordinary skill in the art.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. As used herein, the phrase "and/or" as in "A and/or B" refers to A alone, B alone, and A and B. Additionally, the term "comprising" is used throughout to mean including at least the recited feature(s) such that any greater number of the same feature and/or additional types of other features are not precluded.

To the extent any materials incorporated herein by reference conflict with the present disclosure, the present disclosure controls.

It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A dental appliance comprising:
   an appliance body made at least partially out of a composite material, wherein the composite material comprises:
      an interlocking structure comprising a plurality of interlocking elements, wherein the interlocking structure has a first mechanical property; and
      a matrix surrounding at least a portion of the interlocking structure, wherein the matrix has a second mechanical property different from the first mechanical property.

2. The dental appliance of claim 1, wherein the interlocking structure comprises:
   a first portion comprising a first interlocking element, and
   a second portion comprising a second interlocking element coupled to the first interlocking element.

3. The dental appliance of claim 2, wherein:
   the composite material has a first stiffness along a first direction, and a second, lower stiffness along a second direction, and
   movement of the first and second interlocking elements along the second direction is less constrained than movement of the first and second interlocking elements along the first direction.

4. The dental appliance of claim 3, wherein the first direction comprises a translational direction, and the second direction comprises a rotational direction.

5. The dental appliance of claim 2, wherein the first interlocking element comprises an annular member, and the second interlocking element passes through the annular member.

6. The dental appliance of claim 2, wherein the first interlocking element and the second interlocking element comprise complementary shapes.

7. The dental appliance of claim 2, wherein the first interlocking element comprises a first projection configured to fit into a recess of the second portion, and the second interlocking element comprises a second projection configured to fit into a recess of the first portion.

8. The dental appliance of claim 2, wherein the first interlocking element is intertwined or entangled with the second interlocking element.

9. The dental appliance of claim 2, wherein, when the composite material is in an unloaded configuration, the first and second interlocking elements are spaced apart from each other.

10. The dental appliance of claim 2, wherein, when the composite material is in an unloaded configuration, the first and second interlocking elements are in direct contact with each other.

11. The dental appliance of claim 1, wherein the first and second mechanical properties each comprise one or more of the following: stiffness, modulus, elongation to break, elongation to yield, strength, brittleness, or hardness.

12. The dental appliance of claim 1, wherein the interlocking structure comprises a first material, and the matrix comprises a second material different from the first material.

13. The dental appliance of claim 12, wherein the first material has a first modulus, and the second material has a second modulus different from the first modulus.

14. The dental appliance of claim 13, wherein the second modulus is less than the first modulus.

15. The dental appliance of claim 1, wherein the interlocking structure and the matrix comprise the same material.

16. The dental appliance of claim 15, wherein the interlocking structure comprises a different degree of crosslinking than the matrix.

17. The dental appliance of claim 15, wherein the interlocking structure comprises a different amount of a removable component than the matrix.

18. The dental appliance of claim 15, wherein:
   the material comprises a first polymerizable component and a second polymerizable component,
   the interlocking structure comprises a first ratio of the first polymerizable component to the second polymerizable component, and
   the matrix comprises a second ratio of the first polymerizable component to the second polymerizable component, the second ratio being different from the first ratio.

19. The dental appliance of claim 1, wherein each of the plurality of interlocking elements has a feature size less than or equal to 500 µm.

20. The dental appliance of claim 1, wherein the dental appliance is an aligner, a palatal expander, a retainer, a mouth guard, or an attachment placement device, or an attachment.

* * * * *